Nov. 27, 1956  O. A. WHEELON  2,771,850
HIGH-PRESSURE HYDRAULIC PRESS
Filed March 11, 1952  14 Sheets-Sheet 1

INVENTOR.
ORVILLE A. WHEELON
BY
Edwin Coates
-ATTORNEY-

Nov. 27, 1956     O. A. WHEELON     2,771,850
HIGH-PRESSURE HYDRAULIC PRESS
Filed March 11, 1952     14 Sheets-Sheet 2

INVENTOR.
ORVILLE A. WHEELON
BY
Edwin Coates
-ATTORNEY-

Nov. 27, 1956        O. A. WHEELON        2,771,850

HIGH-PRESSURE HYDRAULIC PRESS

Filed March 11, 1952        14 Sheets-Sheet 3

INVENTOR.
ORVILLE A. WHEELON
BY Edwin Coates
-ATTORNEY-

Nov. 27, 1956     O. A. WHEELON     2,771,850
HIGH-PRESSURE HYDRAULIC PRESS
Filed March 11, 1952     14 Sheets-Sheet 4
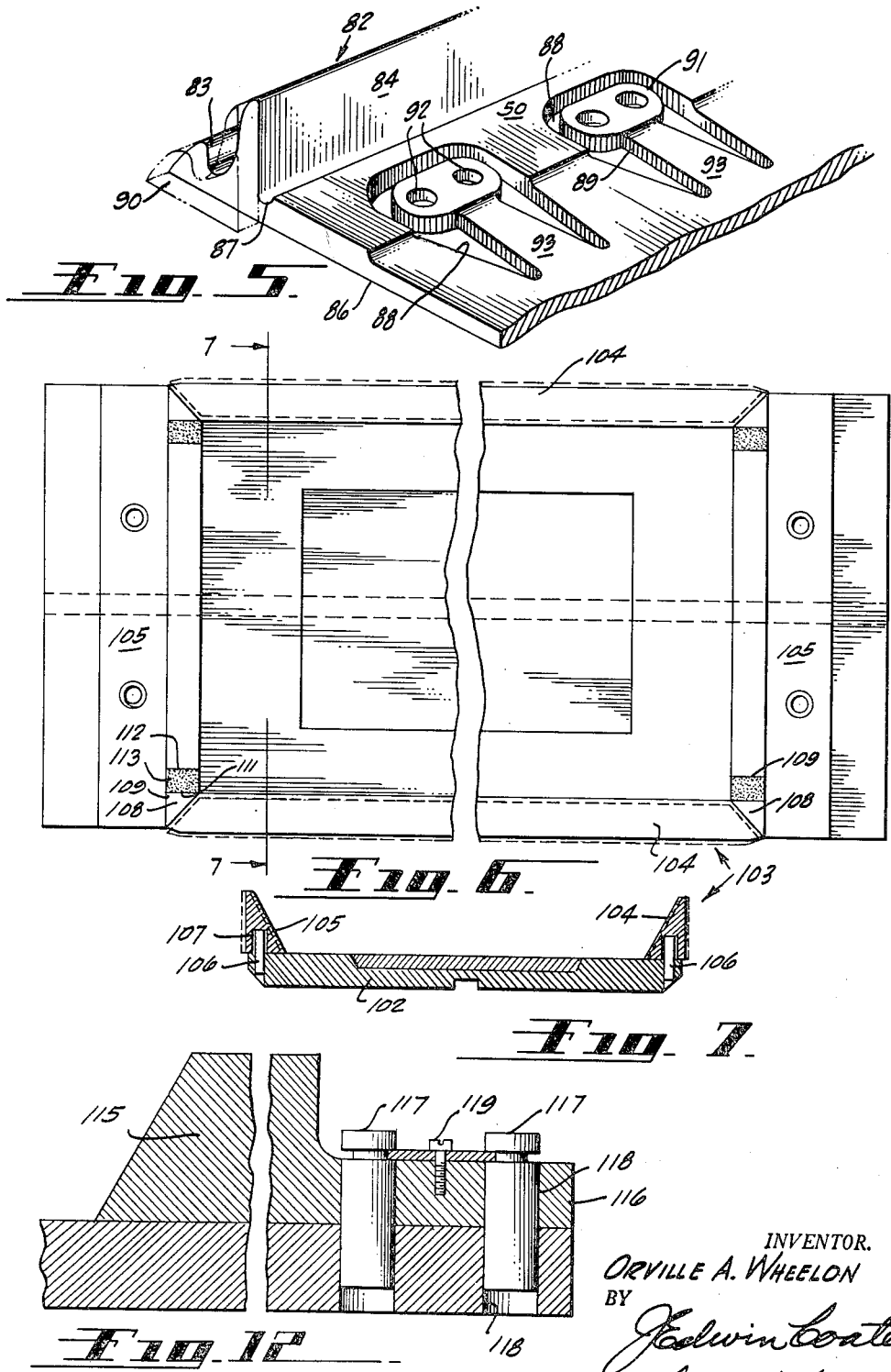
INVENTOR.
ORVILLE A. WHEELON
BY
·ATTORNEY·

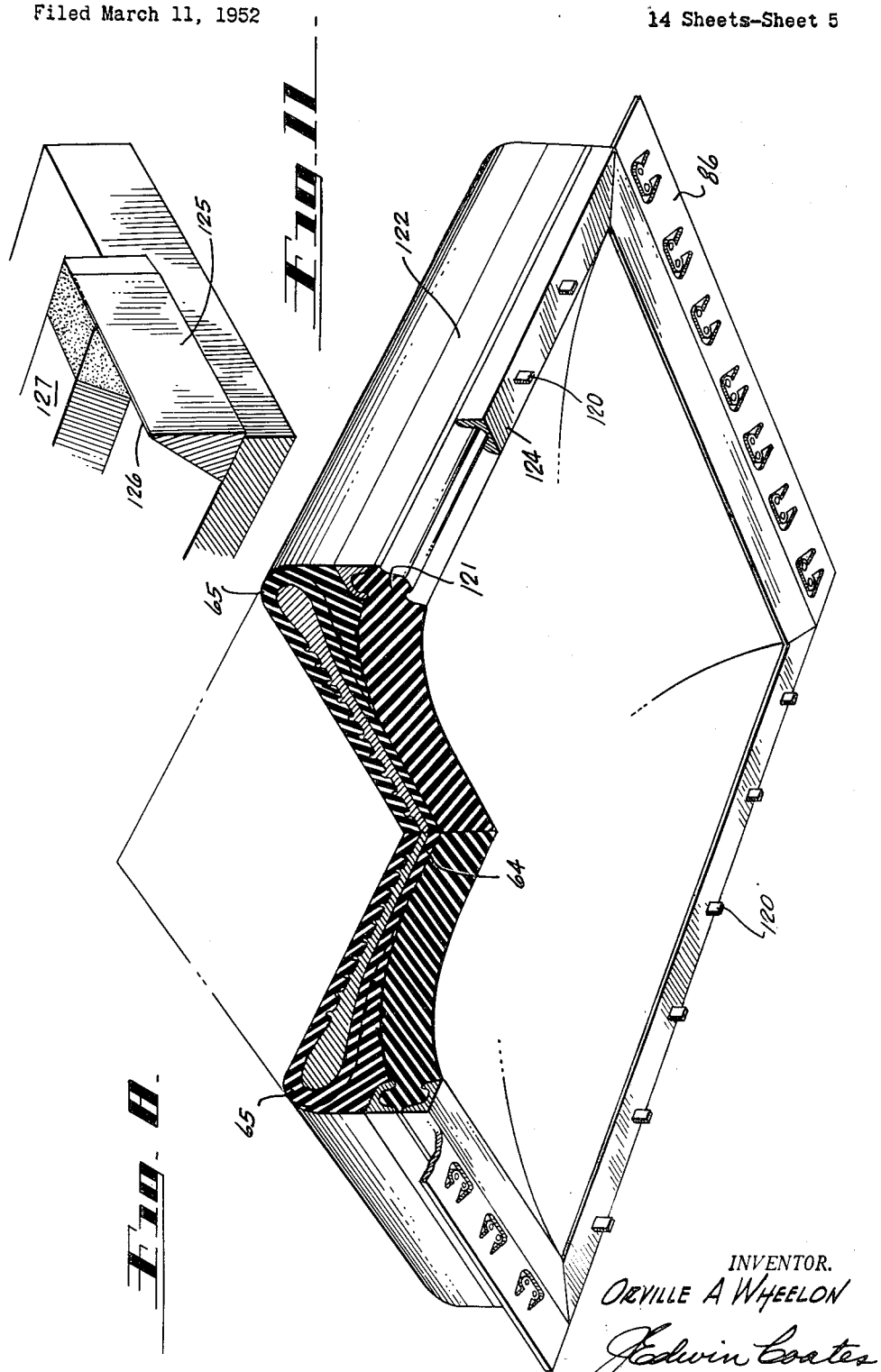

Nov. 27, 1956  O. A. WHEELON  2,771,850
HIGH-PRESSURE HYDRAULIC PRESS
Filed March 11, 1952  14 Sheets-Sheet 6

INVENTOR.
ORVILLE A. WHEELON
BY Edwin Coates
ATTORNEY

Nov. 27, 1956 — O. A. WHEELON — 2,771,850
HIGH-PRESSURE HYDRAULIC PRESS
Filed March 11, 1952 — 14 Sheets-Sheet 7

INVENTOR.
ORVILLE A. WHEELON
BY Edwin Coates
-ATTORNEY-

Nov. 27, 1956     O. A. WHEELON     2,771,850
HIGH-PRESSURE HYDRAULIC PRESS
Filed March 11, 1952     14 Sheets-Sheet 8

INVENTOR.
ORVILLE A. WHEELON
BY
J Edwin Coates
ATTORNEY.

Nov. 27, 1956     O. A. WHEELON     2,771,850
HIGH-PRESSURE HYDRAULIC PRESS
Filed March 11, 1952     14 Sheets-Sheet 9

INVENTOR.
ORVILLE A WHEELON
BY
*Edwin Coates*
ATTORNEY.

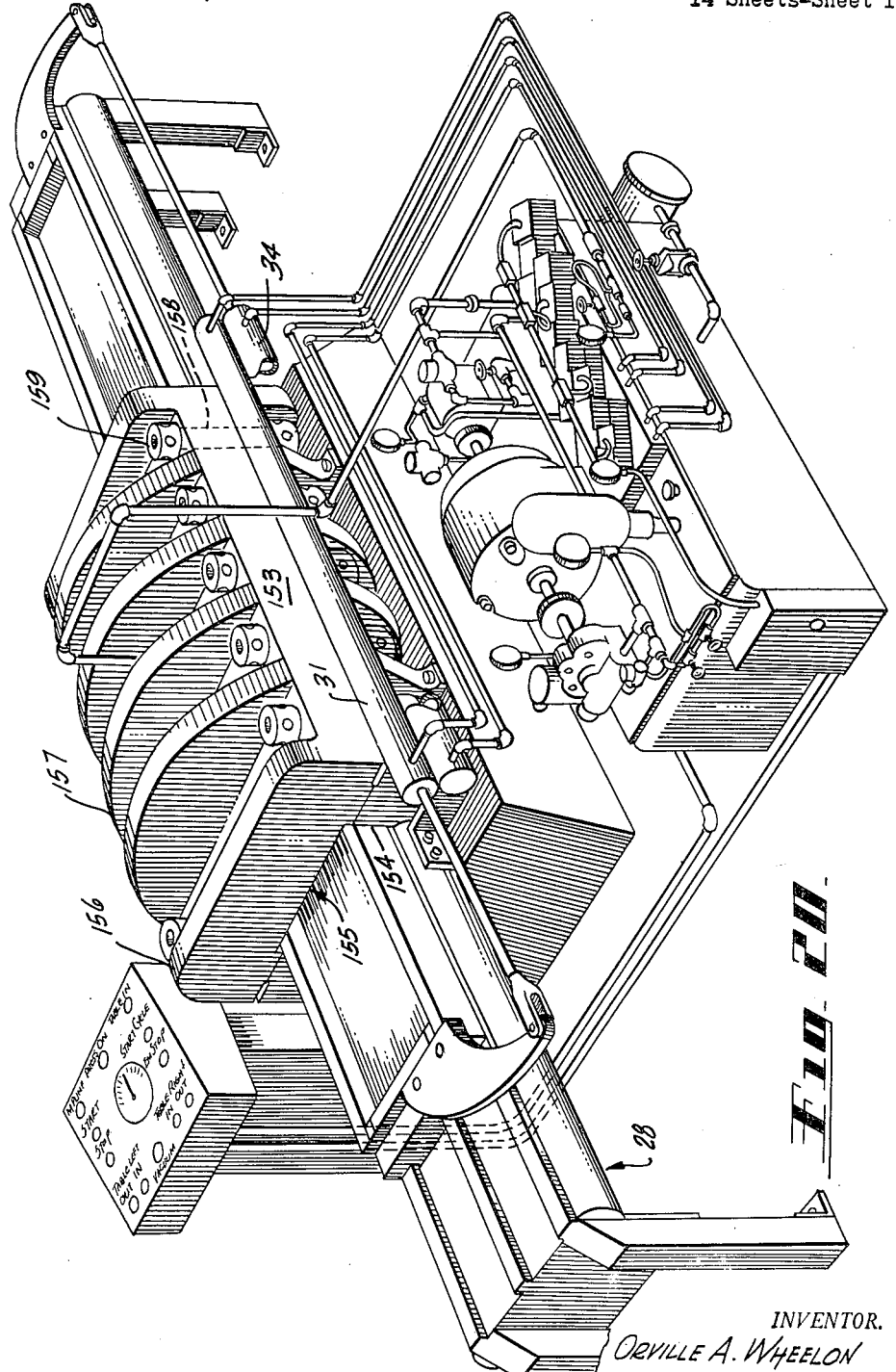

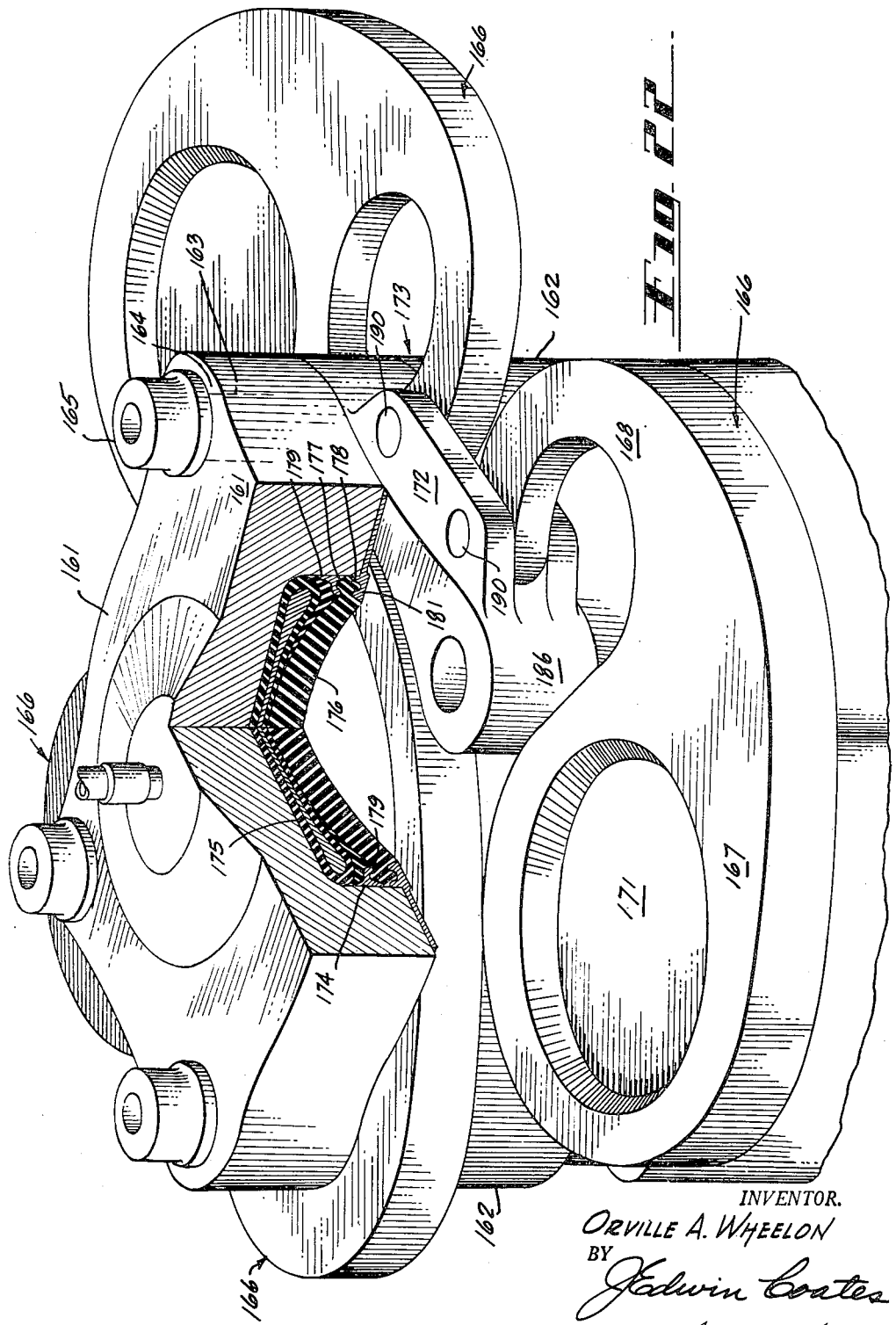

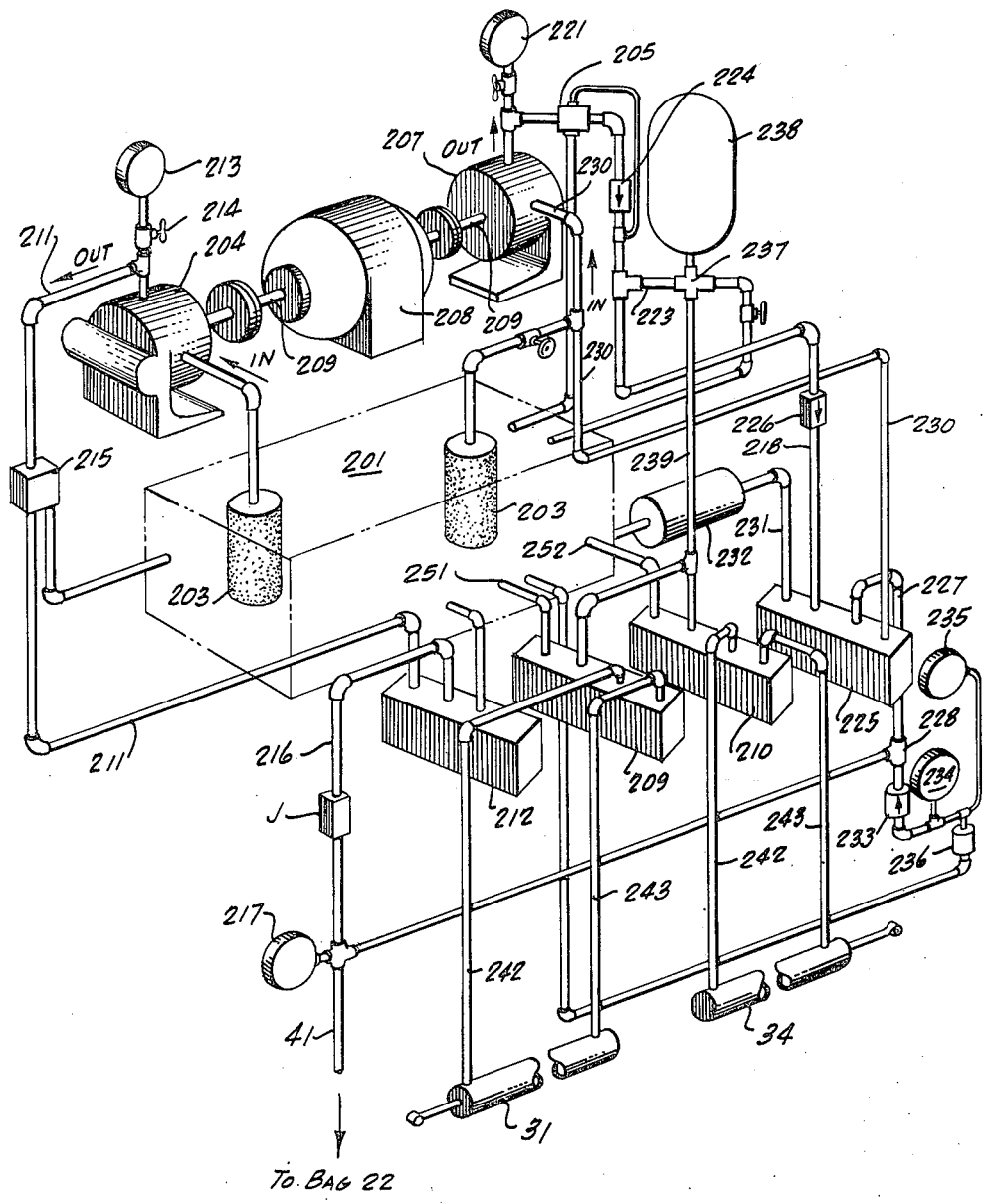

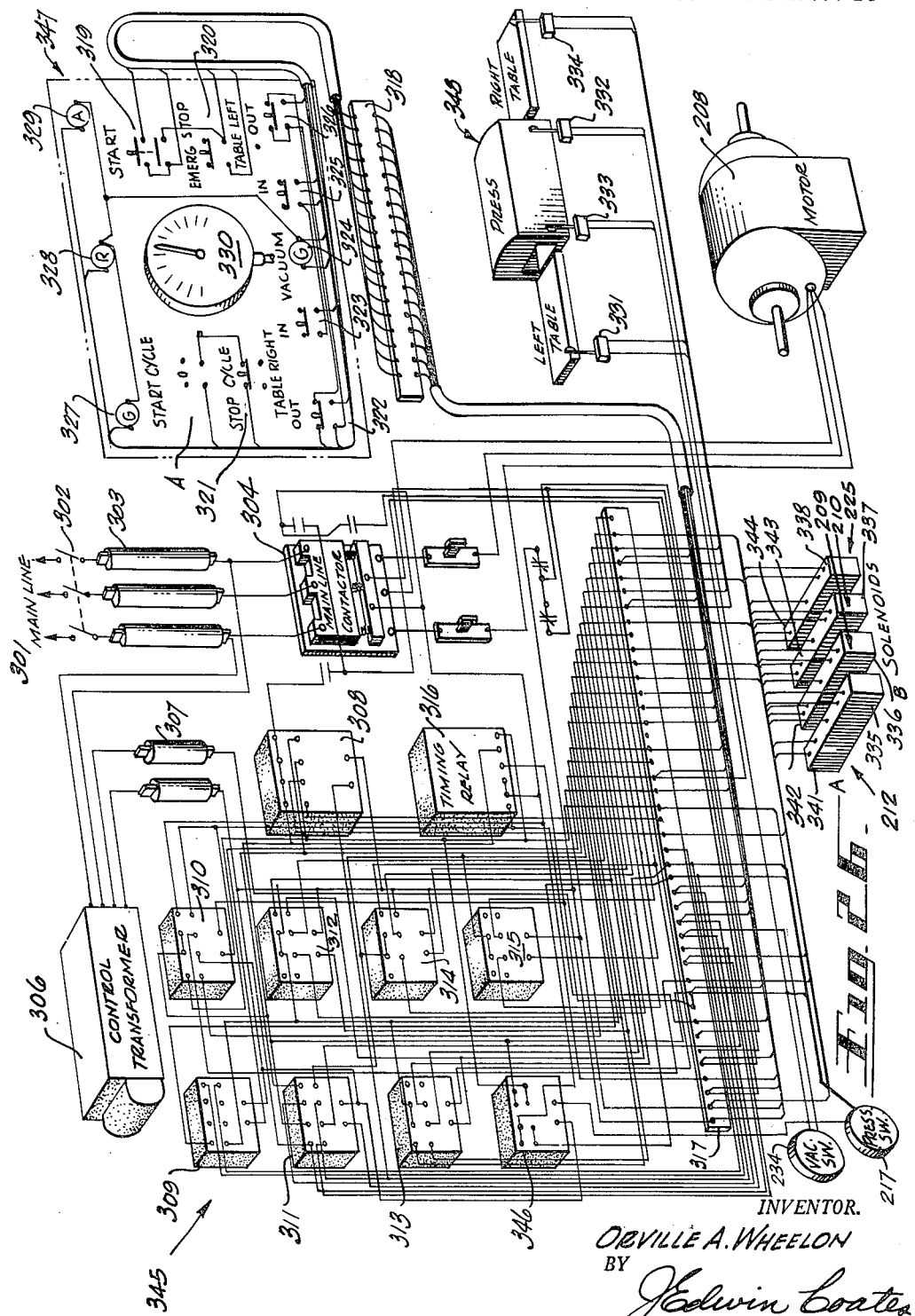

United States Patent Office 2,771,850
Patented Nov. 27, 1956

2,771,850

HIGH-PRESSURE HYDRAULIC PRESS

Orville A. Wheelon, Pacific Palisades, Calif., assignor to Douglas Aircraft Company, Inc., Santa Monica, Calif.

Application March 11, 1952, Serial No. 275,893

21 Claims. (Cl. 113—44)

This invention relates to diaphragm presses, in which an elastically deformable diaphragm mounted in a press-body is hydraulically actuated formingly against sheet material carried on form blocks.

Although a number of types of such presses have hitherto been proposed, it is well known in the sheet metal working industries that these proposals are, though theoretically advantageous in many ways, actually unprofitable, and sometimes even unfeasible, for continuous production duty on anything approaching a large scale.

Among the reasons accounting for the failure of the industry to adopt the diaphragm type press more widely is the fact that in any subsistent type of such press, the press-body has a substantially entirely closed exterior surface, devoid of localized openings for the ingress and egress of the platen, for the pressure-fluid bag or for the metal-forming diaphragm, or pad. In order to enable access to the press interior so that the work may be loaded and unloaded into the press in the conventional type of diaphragm press, the press-body is comprised of two mating halves rigidly united and these halves must be separated each time the press is loaded or unloaded. Extremely high hydraulic pressures are employed in contemporary presses, especially where they are used to form and draw thick, hard sheet metal. This fact partly accounts for the lack of ingress and egress openings in the press body, since it is quite difficult effectively to close and seal such openings by conventional means and unless the openings are properly closed and sealed, the high pressures employed might forcefully eject the platen, pad and bag from the press-body, with obvious consequences to the operating personnel or to surrounding equipment.

The bag of conventional diaphragm presses is susceptible to failure by rupture under the high internal pressures applied thereto by the highly pressurized hydraulic fluid, particularly at the junctions of the walls of the bag. Upon rupture of the bag, the high pressure fluid wall may be projected violently outwardly of the press-body through "tolerance gaps" between the parts constituting the press-body or through a gap between the pad and the press-body. For, contemporary pad-anchoring means are incapable of maintaining the pad scaled to the press-body for any long period of time because of the unbalanced forces applied to the pad and body faying surfaces during the operating cycles of the pad.

The failure of the pad itself often constitutes the source of the impracticability of current diaphragm-type presses. The pad's edges must remain securely anchored in the press-body during repeated high-pressure deflections of the pad that tend to unseat these edges. Again, the pad, while applied to the work under tension in two or more directions, must at the same time be capable of locally "flowing," for example, against sheet metal surfaces to be pressed against "undercut" surfaces on the form-blocks. This local flowing must be achieved without such local shearing as would cause the slightest "nick" in the pad, for, since the pad is under high tension, such nick would soon become a deep tear extending entirely through the thickness of the pad. The choice of a pad of proper mechanical characteristics is not the sole factor to be considered in adapting the pad to this action: it must be anchored in such a manner as to permit substantially the entire volume of the pad, including its edges, to so deflect and bodily move as to enable this local flowing action to occur in substantially any portion of its area and thickness.

The apparent reluctance of the sheet-metal working industries may be attributed to a combination of other reasons, perhaps secondary in importance to those aforestated. These reasons will either be set forth hereinafter or become obvious.

The present invention, in order to render the theoretically advantageous diaphragm-type press economically worthwhile and feasible at the high pressures employed in forming and drawing the thick-gage, hard sheet-metal now coming into widespread use in the industries, remedies all the aforestated, and other deficiencies in such presses by providing a hydraulic, diaphragm-press which, among other improvements, has a basal, or general, configuration that is both novel and advanced. The invention also provides a novel improved co-action between the basal elements of this new configuration and effectuates major improvements in these elements per se.

Broadly, the improved configuration includes, first, a substantially hollow press-body having two opposed major interior surface portions. The press-body may be a true cylinder or an oblate cylinder. In either form, it is horizontally disposed. In this modification the press is primarily employed for forming relatively narrow, elongate parts, such as airframe structural members, including ribs. For use in forming relatively deep small diameter parts, such as those exemplified by "tail cones" the press body is vertically disposed with the operating zone relatively deeper than aforesaid.

In all forms, the press-body includes lateral openings for the insertion and removal of the work-carrying means, and, on occasion incidentally, of the bag and pads without necessitating laying open the press body for these purposes. As in conventional diaphragm presses, the press body contains a hydraulically expansible bag and a pressurally distortable work-forming pad, both being arranged in mutual co-extensiveness with the one of the opposed interior surface portions of the press-body with the pad disposed to be formingly deflected against the work by the expanding bag.

In addition, the press body, contrary to usual practice, contains, in the other of the two opposed major interior surface portions of the body, novel work-carrying means, hereinafter described, movably disposed in confronting adjacency to the pad. Both the bag and the pad are of an improved nature, hereinafter described, and the work-carrying means has such a construction in at least portions of its periphery, and these portions are so disposed with reference to the pad, that the work-forming deflections of this pad set up balanced, outwardly and oppositely directed thrusts on the work-carrying means. These thrusts immobilize the carrier-means in place in the press-body. Thus, the carrier-means are safely held in place by the very forces which, in the conventional diaphragm press provided with lateral ingress and egress openings, would effect forceful ejection through these openings of the work-carrier, pad or bag, or all three, unless complex closure means were provided for these openings.

In the present press, these openings enable movement of the work-carrier laterally into and out of the press-body but are devoid of closures and are obturated by the aforesaid peripheral portions of the carrier means, thus obviating the necessity for opening the press-body to load or unload same, yet without entailing the employment of complex closure means.

The pad is anchored in the press-body by resilient clamping means which also effect a sealing of the pad to the press-body that withstands innumerable deflections and displacements of the pad. This improved pad-anchorage also assists in adapting the pad to be pressurally urged against the work and locally flowed therearound in almost any region of the pad without shearing locally.

The bag is constructed to preclude rupture thereof, particularly at the mutual junctions of its adjacent walls. To this and other ends, it essentially consists of a substantially hollow container having a pair of opposed major walls, a pair of opposed side walls and a pair of opposed end walls. The major wall that is disposed inwardly of the press-body is adapted to displacingly contact the adjacent surface of the anchored pad. A substantially rigid bilaterally extending, planeal reinforcing member is interposed between the bag's major walls and has an aperture in registry with the pressure-fluid port in the bag. The upper face of the planeal member is attached to the inward face of the upper major wall of the bag and the lower end of the conduit leading pressure fluid into the bag is attached in the aperture of the planeal member, thus to freely suspend the bag in the press-body. The lower surface of the planeal member is free from the lower wall of the bag. The edges of the reinforcing member, which lie in adjacency with the side and end walls of the bag, are upwardly curved in order to establish a novel parting plane between the lower surface of the reinforcing member and the upper surface of the adjacent major wall of the bag. This plane is directed upwardly and inwardly away from the lower edges of the bag, thus to establish at the junctions of the side and end walls with the bottom wall, thickened portions which are capable of withstanding all stresses applied to the bag. Bag failure is hence very rarely encountered, if at all, in the operation of the present press.

The scope of the invention is not, however, limited to merely overcoming the aforestated deficiencies, for, in addition to these accomplishments it advances the art in a number of other ways. For example, the invention contemplates that the present press-bodies may be of a laminated construction. The laminations may be stacked horizontally and united in facewise contact, as in the "hydro-vault" and "hydro-toroids" forms, or may be stacked vertically, the lowermost and uppermost laminations mounted for lateral swinging to enable loading and unloading thereof, and in the "hydro-drum" form of the invention. In any of the aforestated forms, the specifications may be altered to include a greater or lesser number of laminations so as to enable the incorporation of all the aforedescribed novel features in presses of widely varying lengths. Thus, a relatively short press-body, which is the economical length for forming metal for all but aircraft components, can be fabricated without alteration in basal tooling in the same plant where are fabricated the relatively long press bodies needed for the formation of airframe components. The designing of such press bodies is hence also rendered very flexible.

Substantially regardless of the size, attitude or shape of the press-body, the invention contemplates that the press-body may be configured with a plurality of the work-carrying means, or platens constructed as described hereinabove. The platens, in the horizontal cylindrical form, are of equal length and are initially disposed supportedly adjacent the ingress and egress openings in the opposite ends of the press body and are separately movable laterally into and out of the press-body. Thus, the difficulties attendant upon the employment of one platen extending the full length of the press body, such as concentrating all personnel in a crowded space at the one end of the press; frequent jamming or breaking of the long platen, and many other operational difficulties, are obviated, while the rate of work is accelerated.

In the vertically stacked form of press-body, four of the platens may be pivotally mounted to the tie rods intermediate the uppermost and lowermost laminations, so that while the one platen is in operative position in the press, the others will be outside same in "loading" position, ready to be successively swung into the place of the first-mentioned platen when the contents of the latter have been formed and the platen has been swung out of the press-body.

The moving parts of the press are adapted to be hydraulically actuated and automatic electrical controls are provided for the aforesaid hydraulic actuating means. Safety interlocks are provided in this control system, so that no part can be moved in the wrong direction or order of operation.

Because the press itself includes no rams, pistons or other reciprocating mechanisms and employs only gradually increasing hydrodynamic pressures to form the work, the operation thereof is shockless and substantially vibrationless. Among other advantages accruing therefrom is the fact that nothing in the nature of the usual special foundation is required for the press, which may be mounted directly to the ordinary factory floor or, in the smaller sizes, even on a movable base.

The press "frame," or body, incorporates no moving parts and all the "load paths" thereof, such as the lamination-tying bolts are relatively short. Since the press needs no disassembly for loading or unloading, these bolts may remain permanently in place. For these reasons, the press may work at markedly higher operating pressures without undergoing significant deflections than can an ordinary diaphragm press.

Among the advantageous consequences is the fact that the press-body can be constructed of lighter and fewer parts than heretofore possible. This reduction in material reduces the cost of fabrication of the present type of press considerably below that of subsistent disphragm presses of the same capacity and operating pressure rating. The saving in the use of critical material is of tremendous importance to the nation's economy.

The invention also contemplates and embodies a novel method of forming or shaping sheet-material. Essentially, this method comprises disposing, on an abutment, such as a platen or tray, sheet material supported on form means having surfaces adapted to coact with the sheet material to form same into predetermined shapes; pressurally forcing and bodily displacing a "flowable," solid surface against the sheet material and around the form-means in such a manner as to both cause said surface to locally flow and bodily displace and pressurally conform said sheet material to said surfaces on said form-means and to pressurally immobilize the platen; releasing said pressural force from said surface; and removing the formed sheet material from the zone of operations.

Several of the presently-preferred embodiments of these and other of the instant inventive concepts, together with detailed showings of novel features in these embodiments, are illustrated in the accompanying drawings and are described hereinafter in conjunction with these drawings. However, it is to be understood that these drawings and this description are furnished merely in order to exemplify the inventive concepts and in no wise constitute limitations on the scope of the invention, the ambit of which is bounded only by the scope of the sub-joined claims.

In these drawings,

Figure 5 is a fragmentary perspective view of a resiliently mountable clamping member which constitutes one of a pair of complementary clamping members employed at each end of the press-body to clamp the pad-end thereat;

Figure 6 is a plan view of one of the pair of platens utilized in this press, the view showing in broken lines the two side walls of the platen in the position occupied by them before the platen is inserted into the press-body;

Figure 7 is a cross-sectional view of the platen of Figure 6, taken on line 7—7 thereof;

Figure 8 is a perspective view, partly in section, of the bag and pad unit including the so-called "co-planeally mounted, peripherally disposed" form of the pad-anchoring means;

Figure 11 is a fragmentary perspective view of the one end of a form of platen particularly adapted for cooperation with the unit of Figure 8;

Figure 12 is a detailed fragmentary cross-section of the right-hand end of a platen provided with a tail-gate removably mounted thereto in an improved manner;

Figure 20 is a perspective view of a plant including a press of the present invention that includes a press-body divided equally along its longitudinal center plane;

Figure 22 is a perspective view of the vertically stacked, horizontally laminated type of press known as the "hydro-drum";

Figure 24 is a view of a substantially complete "hydro-drum" form of plant, showing the press itself in a vertical section taken substantially on the vertical central plane of the press and showing the hydraulic and control systems in elevation;

Figure 25 is a hydraulic flow-diagram of a "power plant" employable with all the present press units, and Figure 26 is an electrical diagram, partly in perspective, of a control system employable with the aforementioned power plant.

Figure 1:
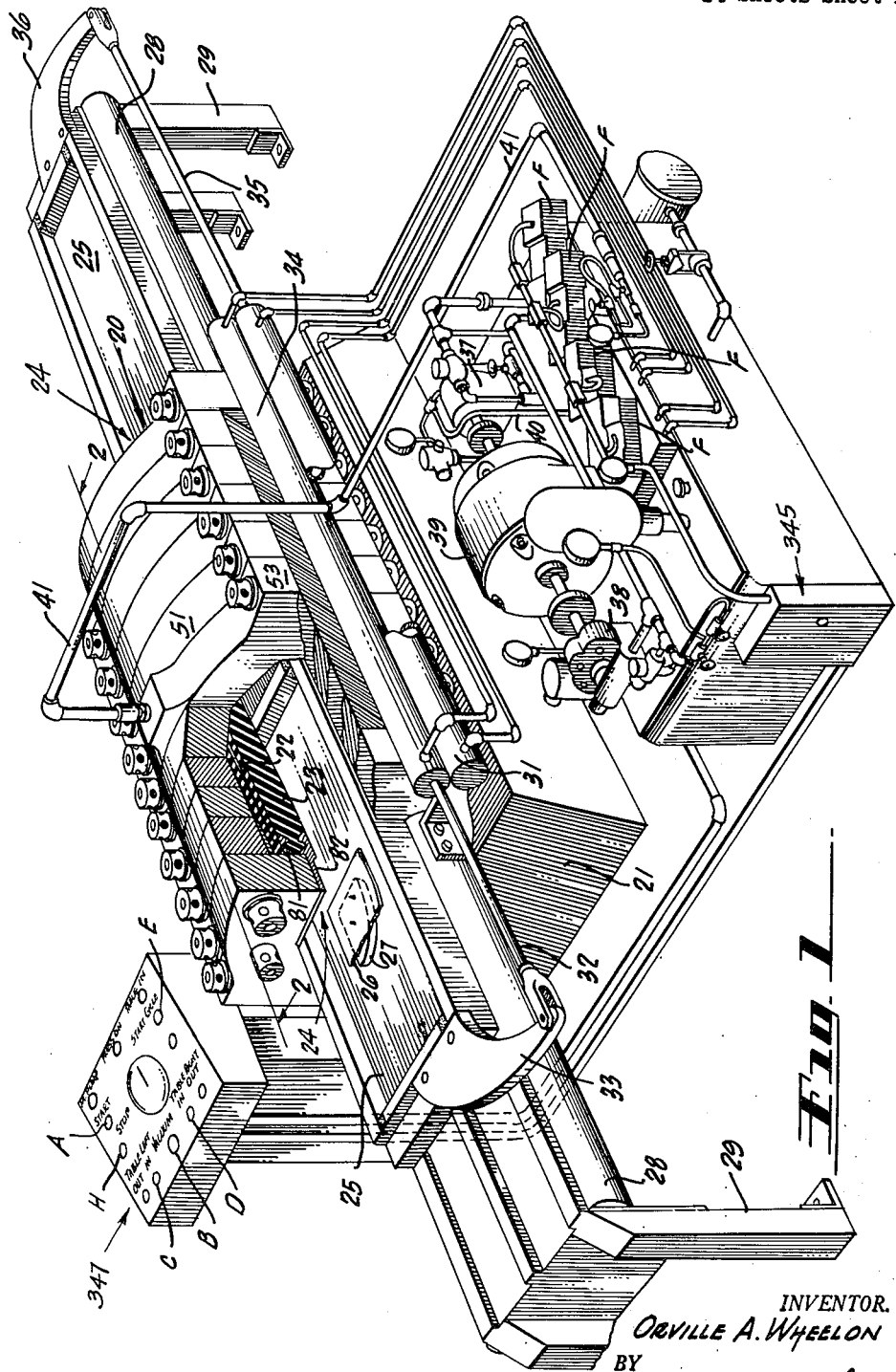
Figure 1 is a perspective view of a complete sheet metal forming plant, the plant including one of the horizontal divided-cylinder types of the present presses which will hereinafter sometimes be referred to as the hydro-vault type.

The plant shown in Figure 1 includes one of the horizontally disposed forms of the present diaphragm-type presses which comprises, among other things, a laminated press-body 20 mounted on a rigid bed 21 for same. Because of its laminated nature, the press body is susceptible of design and fabrication to various lengths while incorporating all the present novelties pointed out more in detail hereinafter. The press-body, as detailed hereinafter, essentially includes an elastomeric forming-force initiating bag 22 mounted coextensively adjacent the upper interior surface of the substantially hollow body, and a substantially coextensive, substantially planeal, elastomeric pad 23, arranged and adapted to be downwardly worked against the sheet metal by the hydraulic forces in the expansible bag. Although not essential, the contacting faces of the bag and the pad may be united, as by a cementitious material suitable for bonding elastomeric materials together.

Each of the opposite ends of the press-body includes an opening 24 through each of which a tray-type platen 25 is adapted to be moved into and out of operative position with respect to the pad 23 while carrying the sheet material 26 mounted on form blocks 27.

The two platens 25 are adapted to be supported and guided for movement into and out of the body 20 on work tables 28. One of the tables 28 extends from each body-opening 24 outwardly in longitudinal alignment with the longitudinal axis of the body. The inner end of each table 28 is supported on the face of the body-end and it and the rest of the table lies in substantial coplanarity with the bottom interior surface of the body 20, while the outer end of each table is supported on one or more columns or legs 29. Other configurations of supports may be employed for the body and tables.

The left-hand platen, as viewed in Figure 1, is movable laterally into and out of the container through the end-opening 24 by means of a hydraulically powered operating system which includes a hydraulic cylinder 31 having a piston not shown and piston rod 32, the outer end of the latter being pivotally connected to the outer end of an arm 33 the inner end of which is rigidly connected to the outer end of this platen. The other platen is operated by an actuating system similarly including a hydraulic cylinder 34 having a piston rod 35 the outer end of which is pivotally attached to the outer end of an arm 36 the inner end of which is rigidly attached to the outer end of the right-hand platen.

Hydraulic power for operating the platens 25, bag 22 and pad 23 is derived from a hydraulic system described in detail in Figure 24 and forming no part of the present inventive creations. It essentially includes a hydraulic fluid contained in a reservoir disposed in, underneath, or adjacent the rigid bed on which is shown mounted a substantially conventional pressure pump 37 and a suction pump 38 driven by a prime mover 39. Pump 37 is flow connectible to the reservoir by a conduit 40 and is pressure-flow connected to bag 22 through a conduit 41, (as described in detail in connection with Figure 24) while pump 38 is return-flow or scavengingly, connectible to the reservoir and to the bag through the conduit 41, by means of suitable valves, switches and conduits, as described hereinafter in connection with Figure 24.

On reaching a predetermined pressure, the pumps are automatically unloaded, as described hereinafter in connection with Figure 24 and the bag decompresses through a surge valve for a short time-interval, after which the low pressure pump withdraws the remaining oil and collapses the bag and lifts the pad. A vacuum switch, as shown in Figure 24, senses the fact when the pad is lifted clear and energizes the table circuit, described in connection with Figure 24. This circuit operates the low pressure pump.

The electrical control circuitry, described in detail hereinafter in connection with Figure 25, but constituting no part of these inventive concepts, is electrically so interlocked that the press cannot be pressurized unless a table is properly indexed in place in the press-body. This interlock assures that no table can be moved unless the press bag is under a vacuum and also prevents the two platens from colliding.

As described in detail in connection with Figure 25, suitable valves, piping and switches for the hydraulic system are mounted on the bed, and a suitable electrical network, described in connection with Figure 25, is provided for operating and controlling the pumps and platens.

Figure 2:
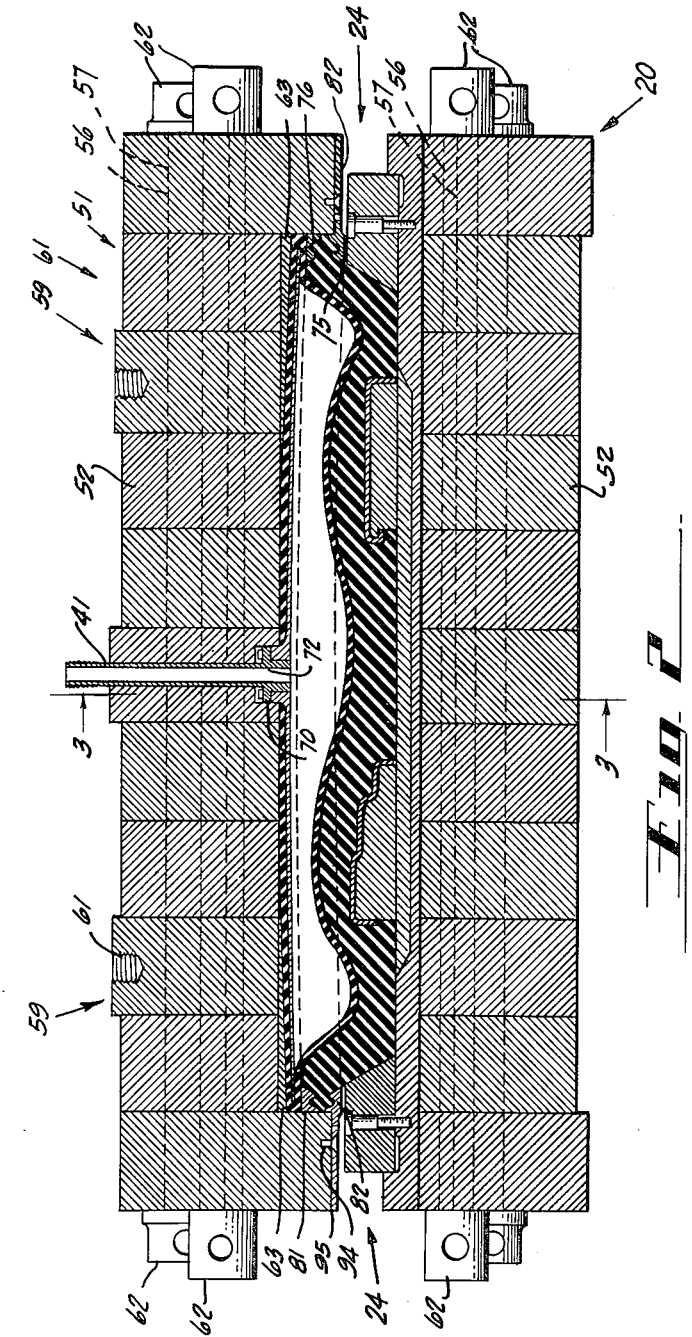
Figure 2 is a longitudinal central sectional view in the vertical plane and taken on line 2—2 of Figure 1 of the press itself.
Figure 3:
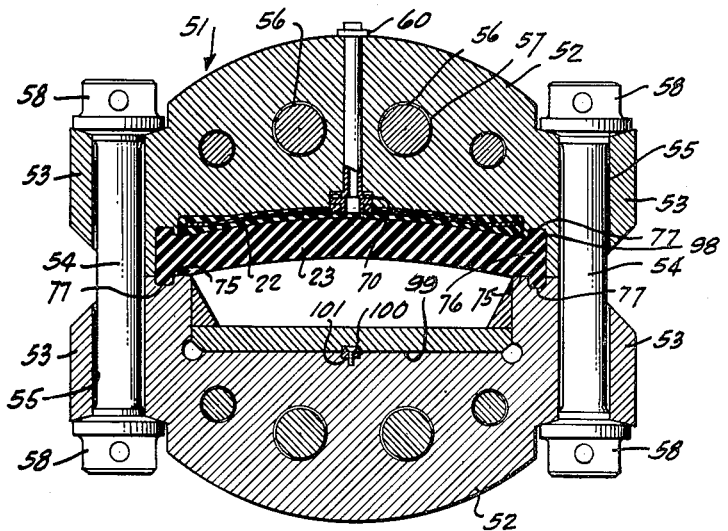
Figure 3 is a cross-sectional view of this press, the view being taken at a longitudinally substantially central location thereof on line 3—3 of Figure 2.
Figure 4:
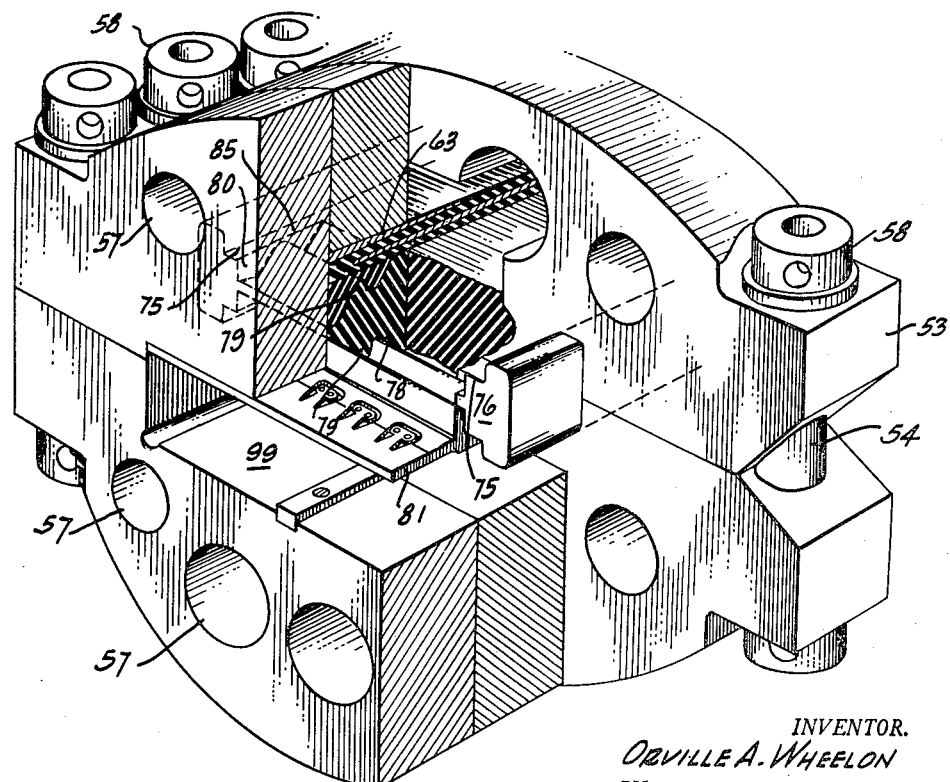
Figure 4 is a fragmentary perspective view of the one end-portion of this press, the work-carriers, or platens, shown in Figures 1 and 2 being absent.

The novel hydraulic diaphragm press of Figure 1 is shown in detail in Figures 2, 3, and 4. This particular constructional form of the invention is particularly well adapted to the forming of elongate airframe parts, such as wing-ribs, longerons, and stringers. The type of press shown is ordinarily so dimensioned and is so configured with the hydraulic system of the plant as to work the sheet-material at a pressure of the order of 5000 p. s. i. The normal capacity of a press of the illustrated type and scaled dimensions is of the order of 2500 tons.

In Figures 2, 3 and 4 it will be seen that the body 20 of the press essentially consists, primarily for the purpose of facilitating inexpensive fabrication, of a pair of matching, substantially semi-cylindrical halves 51 which are disposed horizontally and are coaxially mated to define a hollow, substantially cylindric container. Each semi-cylindrical half of the press-body is constructed of a plurality of semi-toroidal laminations 52, each semi-toroidal lamination being here shown as rectangular in cross-section, the laminations being arranged in respective facewise contact. Each lamination 52 has a laterally outwardly extending portion, or flange, 53, at each of its ends and the flanges on the diametrally opposed laminations are arranged in respective facewise contact.

Fastening means, such as stud bolts 54, are passed transversely through suitable openings 55 in the flanges in order to unite the laminations in the diametral direction. Fastening means, such as stud bolts 56, are passed longitudinally of the apparatus through suitable openings 57 in each of the laminations and serve to unite the laminations in facewise contact. All the studs are heated and torqued in into place under sufficient pretension before they receive operating loads to enable them to fully prevent opening of the press and extrusion of the pad or bag under the highest pressure to which they may be subjected. All the fasteners 54 are disengageably engaged at each end with the adjacent flange surface and may be removed after either one of the two spanner-wrench actuated nuts 58 on the bolt-ends is removed. This construction enables separation of the cylindrical body 20 along its longitudinal horizontal center plane. The upper semi-cylindrical body-half can then be lifted off the lower such half, as by suitable block-and-fall means, not shown. To accomplish this, as indicated in Figure 2, the upper body-half may be provided with lugs 59, having screw-threaded apertures 61 therein to take hook-eyes or the like, not shown, with which the hooks of the lifting tackle can be engaged. Ready removal of a "jammed" or broken platen, a ruptured bag, or a sheared pad, if such events should occur, is thus enabled, without employing the removable side rail configuration, best seen in the sepcies shown in Figure 18 and described in connection with this showing as located between the sides of the platen and the adjacent surfaces of the interior of the body 20 and removable in the manner later described.

The fasteners 56 are also disengageably engaged at their opposite ends with the adjacent faces of the end laminations of the body 20 by means of so-called spanner wrench actuatable nuts 62, so that in the fabrication of the press-body, the body length, and therefore the kind of service for which the press is adapted, can be varied to suit the demands of different customers.

As shown in Figures 3 and 4, the upper semi-cylindrical half 51 of the body 20 normally contains the bag 22 and the pad 23. The bag is disposed in the upper part of the interior volume of the body-half 51 and is laterally and longitudinally coextensive with the interior surface of member 51. The bag laterally conforms to the cross-sectional arch of the press-body but is longitudinally upwardly arched in its median portion, so that the ends thereof are vertically spaced downwardly from the super-adjacent interior surface of the press-body. The pad substantially conforms both laterally and longitudially to the under surface of the bag, to which it may be suitably united, as by an appropriate cementitious material.

At each end of the bag and interposed between the upper surface of the bag-ends and the super-adjacent surface of the press-body is a rigid fairing 63, preferably made of a laminate of hard glass-cloth and a plastic. The down-curved ends of the expansible bag are thus provided with a stabilizing abutment against operating forces.

Figure 13:
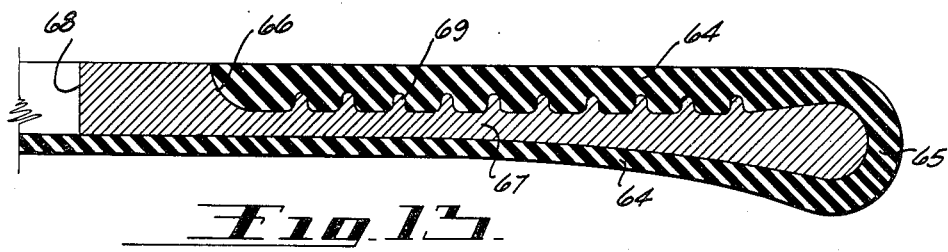
Figure 13 is a cross-sectional view of one of the novel "bags" of this invention which is particularly adapted for use with the vertically disposed, or "hydrodrum," form of the press.
Figure 14:
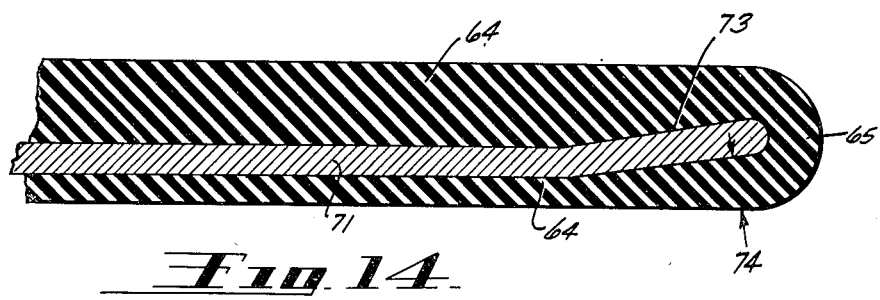
Figure 14 is a similar view of another of the present novel bags, the bag being particularly adapted for use with the horizontally disposed types of the press.
Figure 15:
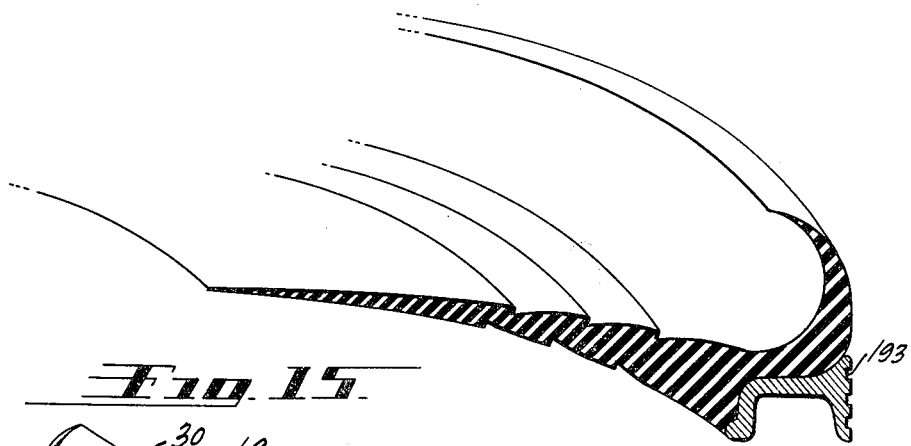
Figure 15 is a cross-sectional view of the one side of the annular, elastomeric filler employed in the vertically disposed, hydro-drum type of the present press in the peripheral space between the domed pad and the pad.

The bag 22 is, as fragmentarily depicted in the various views, essentially a vertically flattened, rectangular container composed of an elastomeric material such as rubber, synthetic rubber or the like and has a plurality of pairs of opposed walls including the major, or upper and lower, walls 64, shown in Figures 13 and 14, and the minor, or side and end, walls 65. The lower wall 64 operatively confronts the pad for pressurally displacing same against the work carried on the platens and the upper wall 64 is adapted to operatively abut against the interior surface of the upper body-half. The upper major wall is apertured, as shown in Figure 13, as at 66, in its central region to enable the passage therethrough of pressure fluid, and a substantially rigid plate 67 having a "bossed" aperture 68 therein, is disposed on the normal longitudinal center plane of the bag. The plate extends bi-laterally outwardly from the aperture, its edges lying in adjacency to the two end walls and the two side walls of the bag. The upper surface of plate 67 is fixedly related to the inner surface of the upper wall of the bag. To this end, there may be employed a positive, molded interlock as by means of corrugations 69 formed on the plate's upper surface and molded unitary with the rubber wall. The invention also contemplates as within its scope a more positive union of the plate and the upper wall. To this end, the upper surface of the plate may be roughened, as by sandblasting, and an adhesive adequate to effect adherence thereof to the inner surface of the upper wall of the bag is interposed between these surfaces.

In either case, the lower surface of the plate 67 has a polish-finish, or is otherwise maintained in separation from the upper surface of the lower wall of the bag, in order to enable the lower wall of the bag to fall free from the plate and to be distended against the pad.

The inner end 72 of conduit 41 is disengageably engaged with the inner surface of the bossed aperture 68 in the plate 67, among other reasons, for the purpose of suspending the bag 22 in the body 20 by means including the conduit 41 and the plate 67. This engagement may consist either of a conventional threaded union (not shown) of the end 72 with the threaded boss, the conduit 41 being sealed to the boss by means of an O-ring (not shown); or by means of conventional split-ring type of mounting shown at 70 in Figures 2 and 3. This mounting enables rotation of the conduit 41 about its longitudinal axis, and, as is conventional, includes a peripheral groove in the lower end portion 72 of the pipe. In this groove, as is conventional, are engaged mating semi-circular disk-halves, the disk-halves being removably secured facewise to the upper surface of the bossed aperture. In addition, the same conventional O-ring seal, as above, may be employed.

The conduit 41 is held against vertical displacement by a check nut, or the like, 60, disposed therearound just outside the body 20 and bearing against the body by its lower end.

The four edges 73 of the modified plate 71 of Figure 14, which is preferred for use in some installations, are upturned towards the upper wall of the bag and these plate-edges terminate considerably short of the edges of the bag. As shown in Figure 14 by this relative configuration of parts, the lower wall of the bag is provided at its edges with a vertically and laterally thickened portion 74 well adapted to absorb the rather high stresses brought to bear on all the edges of the bag by the stretching downward displacement of the lower wall of the bag under the effect of the pressurized fluid. Hence, all those stresses, particularly the centrally directed tensions, which tend to rupture the bag at the edges thereof, are distributed over a mass which is sufficient in area and as to its radius of gyration and moment of inertia, to obviate separation or tearing of the joined walls at the corners of the bag.

The details of the means mentioned above for forcing pressure fluid into the bag and for "scavenging" it from the bag are shown in Figure 24 and are described hereinafter in conjunction therewith. Suffice it now to state that the hydraulic power system and control system aforementioned are selectively effective to alternately force and scavenge hydraulic fluid pressurized to the order of 5000 p. s. i. into and out of the bag.

The pad 23, in the one of the many forms it can assume, that is illustrated in Figures 1–4, essentially consists of a rectangular or oblong sheet of elastomeric material having a uniform thickness selectively varied according to the requirements of the individual press. Whatever these working conditions may be, an elastomeric material is employed which is "flowable" in all three of the spatial directions—vertically, laterally and longitudinally—and is substantially completely conformable around the form-means on the platen. This material must also be one which, while under tension, can withstand considerable incising, or abrasive action, from the sheet-material being worked on the form-block. Among elastomeric materials suitable for employment in this invention, therefore, are, in addition to rubber, neoprene, nylon isomers that are resilient and the like.

The pad 23 is disposed in the upper body-half in confronting adjacency with the inwardly facing surface of the lower wall of the bag but has an area considerably greater than same in order to provide a marginal portion 75 at each longitudinal edge thereof adapted to be anchored to the adjacent side-surfaces of the body-half independently of the mounting of the corresponding edges of the bag. Each longitudinal marginal portion includes a double-beaded portion 76 extending the full length of said portion and the super-adjacent portion of the interior surface of the upper body-half and the sub-adjacent portion of the lower body-half bear grooves 77 extending the full length of the pad and having a depth and contour such as to firmly anchor the bead 76 in place. Thus, the pad is restrained laterally against the high operational forces applied thereto by the bag.

At each end of the pad, as shown in Figure 4, the marginal portion is provided with a groove 78 extending transversely of the pad almost to each of the longitudinal beads and lying some distance inwardly of the adjacent end-edge of the pad. Outwardly of this groove and towards each end-edge of the pad, the pad is provided with a bead 79 on each of its major or upper and lower surfaces. Each bead 79 is laterally coextensive with each groove 78 but each bead 79 lies inwardly of the adjacent outer end of the pad. The extreme end-portion of the pad is thinned to provide a vertical space 80 on each face of the pad in this end-portion between the bead and the extreme end-edge of the pad, that amounts in effect to a transverse groove.

In order to anchor the ends of the pad and concurrently to seal the gap between the upper surface of the ends or tail gates of the platen against extrusion therethrough of portions of the pad, dually functioning complementary pad-clamping and tail-gate sealing members 81 and 82 are provided and disposed in respective engagement with the respectively opposite grooves and beadings at each end of the pad. Each of the units 81 extends transversely of the pad end coextensively with the grooves and beadings and fills the vertical space between same and the lower surface of the bag. Each of the units 82 is resiliently attached at its outer end to the upper surface of the adjacent aperture 24 in the container 20. This portion of the clamp and seal member 82 is configured and attached in such a manner as to adopt it to resiliently support the edge portions of the pad so that it may yield downwardly pressurally displaced pad during operation of the press. In addition to the platen-end sealing mentioned above, this action enables almost the entire length of the working surface of the pad, right up to the end edges thereof, to be employed to the fullest extent in exerting forming-pressure on the sheet material. Also, this resilient attachment of the lower clamp automatically effects return of the clamped end-portions of the pad, after bag pressure is released, to their normal positions clear of the path which the platens must follow in their movements into and out of the press body 20. The side edges of the pad are of course always vertically clear of the path of the platens and since the pad is laterally domed, normally the portion of the pad lying inwardly thereof from the edges and ends also is clear of the path of the platens.

As shown in Figure 5, each of the clamp members 82 consists of an upwardly concave portion 83 conformed to the lower face of the bead and groove on the pad end; an upright flange 84 on the clamp serving also as an end seal for the intact, or unbeaded and ungrooved end portions 85 of the pad and a substantially horizontal planeal portion 86 adapted to facewise fit the upper face of each aperture 24. This substantially planeal portion is provided near the flange with a "relief" groove 87, augmenting the resiliency of the clamp, and followed by a ridge or land 90, in order to provide a bearing surface for the clamp.

The body of the planeal portion is provided with a plurality of laterally spaced, mainly longitudinally extending punched apertures 88 each of which includes an ear 89 having a lobe 91 that includes two perforations 92, the lobe being connected to the body of the planeal member by a neck 93. Through each of the perforations 92 is passed a bolt or machine screw 94 the inner end of which engages in the superadjacent face 95 of the aperture 24. One of these dual function pad clamping and plate-sealing and extrusion-preventing resiliently mounted members is of course attached in this manner at each of the two ends of the pad. End-sealing members 90, preferably Micarta blocks, are provided at each end of each of the clamps 82 and engage with the adjacent surface of the press-body to seal this region of the proximity between the clamp, the pad, and the press-body.

It is not obligatory that the press-body of Figures 1–4, inclusive be constructed in two semi-cylindric halves for it to be possible to remove a jammed or broken platen, or to remove and replace the bag and pad. For, the lower body-half shown in Figures 1–4 may be constructed, if desired, in the same manner as the embodiment illustrated in Figure 18. That is, the lower body-half of Figures 1–4, inclusive, may be constructed in a laterally segmented-form that, diametrally, includes the platen bounded on each longitudinal side by removable side-rails, or key-like members 96. In this instance, the side walls 97 of the interior surface of the lower body-half lie substantially vertically below the outer walls 98 of the bead-holding grooves 77 in the upper body-half. The space extending longitudinally between each of the longitudinal sides of the platen and the adjacent side wall 97 is occupied by one of the elongate key-like members 96. Each member 96 has a generally rectangular cross-section, and the lower planeal surface thereof rests slidably on the planeal interior surface 99 of the lower body-half. If desired, the upper surface of each key member 96 may be contoured to receive one of the beads on the super-adjacent pad-edge, but this concavity is not essential as the pad will be adequately retained in place without this concavity.

The platens 25 are of the tray type and, as shown in Figure 6, are oblong in planform and upwardly concave. That is, each platen comprises a substantially planeal base member 102, elongate side walls 103, and inwardly bevelled tail gates 104. Each base member 102 has, on its lower face, a centrally disposed longitudinally extending guide and centering groove 100 adapted to engage an elongate key 101 mounted in the lower half of the press body.

The major portion of the area of the upper face of the base member 102 is occupied by a centered depression, or "dropped-center" 50 which, among other things, serves the purpose of enabling the same platen to accommodate shallow forming work around the edges of the dropped center and deep-drawing work in the dropped-center.

The side-walls 103 are preferably outwardly bevelled as on face 105 from their lower inner edges up towards the upper faces thereof or are downwardly sloped on their inner faces for their full length. The lower face of each wall is maintained laterally slidably in contact with the upper face of the base member by means of dowels or the like 106 which are mounted in laterally enlarged grooves 107 in the platen walls 103 to enable the walls to slide laterally inwardly and outwardly of the upper face of the platen. Each of the ends of each wall is angled inwardly as at 108. The opposite ends of the upper surface of the platen are closed by the tail gate pieces 104. Rabbets 109 are formed at each corner region of the inner face of each tail-gate 104. Between the inner face 111 of each portion 108 and the inwardly adjacent face 112 of each rabbet is disposed a block 113 of suitable material, such as an elastomeric material, which is easily deflectable but is dimensionally recuperative upon being unloaded. The initial maximum lateral dimension of the platen hence is, within reasonable limits, of no great importance. Close tolerances with the press-body walls are therefore not required in the fabrication of the platen, for, upon insertion of either end 114 of the platen into an aperture 24 the yielding of block 113 enables the platen to be easily but tightly fitted into the lower body half, the inward bodily shifted side walls of the platen tending to spring against the press walls and taking up all finite lateral clearances between the sides of the platens 25 and the lower half of the press body.

Instead of the conventional mounting of the tail gate 104 that is shown in Figures 2 and 6, the form of mounting shown in Figure 12 may be employed. The construction there shown comprises a bar 115 bevelled inwardly and downwardly on its inner face as in Figure 2, the opposite side of the bar being milled or routed out as shown to form a thinned, outward extension 116 by which the tail gate is attached to the platen. For this attachment purpose, dowels 117 are seated through openings 118 in the extension and in the base member 102 and are removably held in place by locking means 119.

Figure 16:
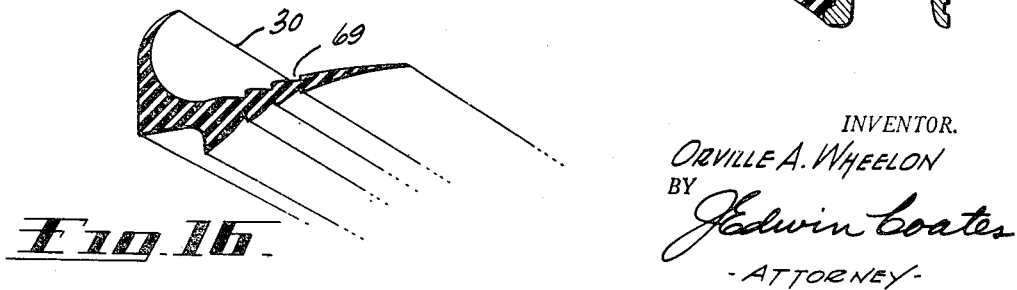
Figure 16 is a similar view of one of the rectilinear elongate, elastomeric fillers employed in the horizontally disposed types of the present press between the pad and the bag at both side edges of same.

As shown in Figure 16 the clearances between the longitudinal sides of the domed pad 23 and the superadjacent sides of the bag 22 are filled by elongated elastomeric members 30 having a hook shape in cross section, the curve or short portion of the hook being adapted to engage and seat the bag and the long portion of the hook being adapted to extend transversely between the bag and the pad. The upper and lower faces of the filler 30 are provided with a plurality of longitudinally extending, laterally spaced grooves 69 which serve the purpose of laterally contracting when the filler is compressed by the pad, in order to laterally force out of the grooves the air originally trapped therein thereby to set up an air tight, or vacuum seal, between the pad, bag and filler.

The cycle of operations of the plant shown in Figures 1–4 inclusive is initiated by pressing a button which constitutes no part of this invention, on the control console. This pressure closes a circuit, shown in, and described in detail in connection with Figure 25, which energizes electric motor 39. Sequentially, the control system of Figure 25 effects connection of the vacuum pump 38, through certain conduits, valves and switches described hereinafter in connection with the hydraulic system shown in Figure 24, to the conduit 41, so as to scavenge the bag 22 to the sump, not shown. When a vacuum of about 15 inches of mercury is attained in the bag, a green light B on the console indicates the fact that the bag has been completely scavenged.

The next step in the cycle of operations concerns moving the work-loaded platens into the press-body. Upon pressing a button C on the console, the left-hand platen, shown in Figure 1 as partly inside the press, is urged by the hydraulic ram 31 fully into the press body. Button D on the control console effects the same action for the right-hand platen.

The start-cycle button E is then pressed and the solenoid valves F, described hereinafter in connection with Figure 24, are shifted, by means included in the electrical control system of Figure 25, to change the flow-direction from vacuum to pressure and effect connection of the pressure pump 37 to the conduit 41. Thereafter, pressure is built up, through conduit 41, in the bag 22, sufficiently to complete the work-forming operation, whereupon a pressure switch G described in connection with Figure 24 is automatically actuated or until the stop-cycle button H on the console is pressed. In either case, the bag 22 is decompressed through a surge damper J of Figure 24 for approximately 6 seconds, and then the aforesaid solenoid valves F automatically shift to change the flow in conduit 41 and in the rams 31 and 34 to a vacuum cycle. This last action effects withdrawal of both platens from the press and onto the tables 28 with the finish formed work thereon ready for unloading.

It is essential to observe at this juncture that in this form and, in fact, in all the other horizontally disposed forms of the invention, the press-body has an opening 24 in each of its end-faces, provided primarily for enabling insertion and removal of the platens, and to enable access to the pad and bag without laying the press-body open. In contrast to the ingress and egress construction in certain conventional hydraulic diaphragm presses, the egress and ingress openings 24 are of permanently fixed dimensions in any individual press and neither opening is provided with a door, shutter or any sort of obturator that constitutes a structural component of the opening itself. These openings are obturated only when the platens 25 are immobilized, and accurately indexed in their working positions, by the balanced end-thrusts thereon of the downwardly deflected pad, the platen base 102, tail gates 104, clamps 82 and sealing blocks 90 constituting the sole closures for openings 24. Also, since at this time the downward pressure of the pad on the resiliently mounted clamps 82 forces these clamps into sealing contact with the upper surfaces of the tail gates 104, extrusion of the pad or bag through any portion of the openings 24 is prevented despite the elevated pressures employed in the press. In fact, the higher the hydraulic pressure, the higher the platens are forced downwardly against the sub-adjacent face of the press-body and the tighter the clamps 82 are held against the tail gates, so that so far as extrusion of the bag and pad through the end openings 24 is concerned, the pressures that may be employed in the present type of press may be of a magnitude far exceeding those employed in contemporary "rubber-pad" presses. Since the vertically extending tie bolts are highly pre-loaded, the faying surfaces of the two body halves are correspondingly preloaded so that extrusion of the pad and bag through the parting plane of the two body-halves is prevented.

Thus there are no openable clearances in the press-body during the operating cycles of the press.

It should also be here noted that the endwise-directed forces applied to the platens by the pad are taken by the tail gates and are balanced out by the inwardly and downwardly directed reactions of the slanted inner faces of the tail gates. All forces directed other than endwise or downwardly, that is, lateral and upward forces, are taken by the side walls of the press-body.

In all species of the invention, it is to be observed that the bag is crowned or domed laterally to conform to the upper interior surface of the press-body. The bag is also domed longitudinally with transition fairings interposed between these ends and the super-adjacent interior surface of the press-body to take up the clearances and provide reaction abutments. Among the other advantages of this construction is the fact that it facilitates bleeding the hydraulic fluid out of the bag during the vacuum cycle of the operation of the press and allows pad to be lifted clear of the platens.

The platen actuating cylinders 31 and 34, shown and described as disposed exteriorly of the press-body, may, in all the horizontal types of the invention, be instead built into the wall of one of the body-halves, among other things, to minimize the lateral space occupied by the press and to enable the personnel to work from or on both sides of the press.

The operation of the press can best be seen in Figure 2, where the pad is shown as bodily displaced adjacent the sheet metal by the hydraulically distended and deflected bag with sufficient force to cause the pad to first bend the sheet-metal around the exterior surfaces of the form blocks and then to cause the pad to locally flow toward the undercut surfaces of some of the form blocks, thereby to complete the forming operation.

Figures 9, 10:
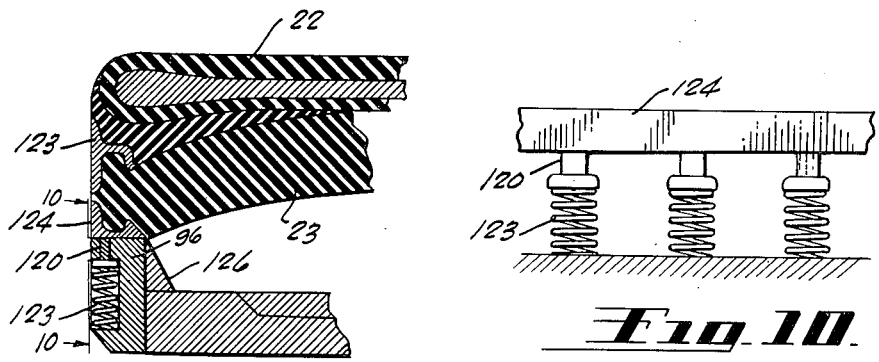
Figure 9 is a fragmentary cross-section of this unit mounted on a platen provided with spring-loading means for activating the pad-anchoring means.
Figure 10 is a detailed longitudinal section thereof on line 10—10 of Figure 9.

In Figure 8, the pad employed in the horizontally disposed, divided-body type of press is shown as having a double-bend 121 extending continuously around its periphery and engaged by upper and lower damping members 122 and 124. The clamps 122 engage the upper portion of the bead 121 and are arranged in mutual co-planarity, the ends of the clamps 122 being so mutually mitered as to enable adjacent ends of the clamp to be fitted together. The clamp members 122 of the upper clamp unit, are floatingly mounted, like the upper clamps 81 of Figures 1-4, inclusive. The two longitudinally extending members of the lower clamp unit 124 are floatingly supported on the adjacent upper surface of a sub-adjacent removable side-rail 96 mounted in the lower portion of the press-body, as shown in Figures 9 and 10, by means of a plurality of vertically extending "loading" units disposed in longitudinally spaced relationship in each of the two rails 96. Each such unit comprises a headed reciprocably mounted plunger 120 engaging a sub-adjacent spring-unit 123, these units thus yielding downwardly when the bag and pad unit are inserted and springing upwardly against the lower surfaces of the edges thereof when the latter are in place. The transversely extending members of the lower-clamp-unit 124 are substantially identical with the clamps 82 of Figures 1-4, inclusive and are similarly supported at each of the opposite ends of the pad as, and for the purposes, described in connection with those figures, as by means 86 such as those previously described. Such construction enables the clamps to be resiliently mounted to the super-adjacent surface of each of the ingress and egress openings, as by means of flush-headed bolts.

By means of the pad clamping and supporting arrangement shown in Figure 8, the pad and bag unit thereof may readily be slipped into the upper portion of the integral press-body, whereafter the regular platens or the modified platens of Figure 11 may be inserted in place. In using this unit, it is not necessary to employ either of the fairing members of Figures 1-4, inclusive, since the elastomeric filter employed therein can be here made co-extensive with the entire periphery of the gap between the bag edges and the pad edges.

With this bag and pad unit and co-planeal clamps, it may be desirable to employ the platen of Figure 11. This platen comprises a pair of side walls 125 each of which includes a wide upper bearing surface instead of the sharp edges shown on the walls, previous platens. Surfaces 126 are adapted to engage a portion of the lower surface of the longitudinally extending clamps 124, as the side rails 97 may, in certain designs incorporating this bag and pad unit, be so narrow as to not extend fully across underneath the lower clamps 124. The inner portions 127 of the platen's tail gates and the previously described rubber blocks disposed between the ends of the side walls 125 and the adjacent tail gate, to absorb finite lateral clearances between the sides of the platen and the adjacent sides of the press body are here made thick enough vertically to cause their upper surfaces to lie in co-planarity with the surfaces 126.

In this form of pad and bag unit and of the platen, as well as in the forms previously described herein, each of the platens is accurately indexed immobilely in its proper operating position in the press body by means of the engagement of the end portions of the downwardly urged pad 23 with the slanted inner faces of the members 127 in such a manner as to balance out the end thrusts on the platen due to the hydraulic forces. The equal and oppositely directed end thrusts of course are also given a downwardly and inwardly directed component by the slanted inner face of the tail gates, which component tends to press the "balanced" platen firmly against the sub-adjacent surface of the press-body. All the other forces set up by the working pad, and including the laterally and vertically directed forces or reactions, are transmitted to the side walls of the press body.

Figure 17:
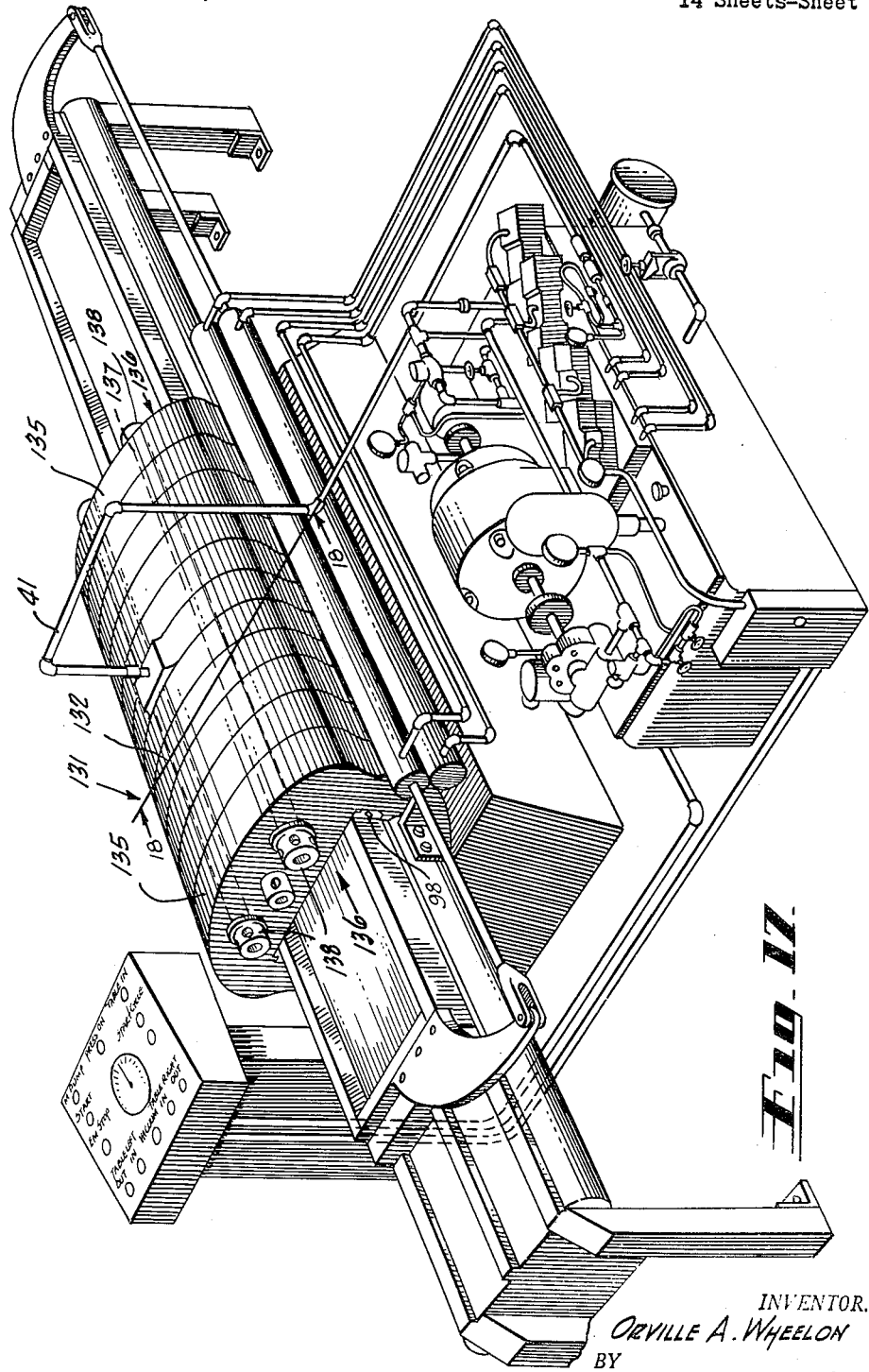
Figure 17 is a perspective view of one of the sheet-metal forming plants of this invention in which the press-body is of oblate-cylindric form and is comprised of a plurality of facewise united, toroidal laminations and is hereinafter referred to as the "hydro-toroids" press.
Figure 18:
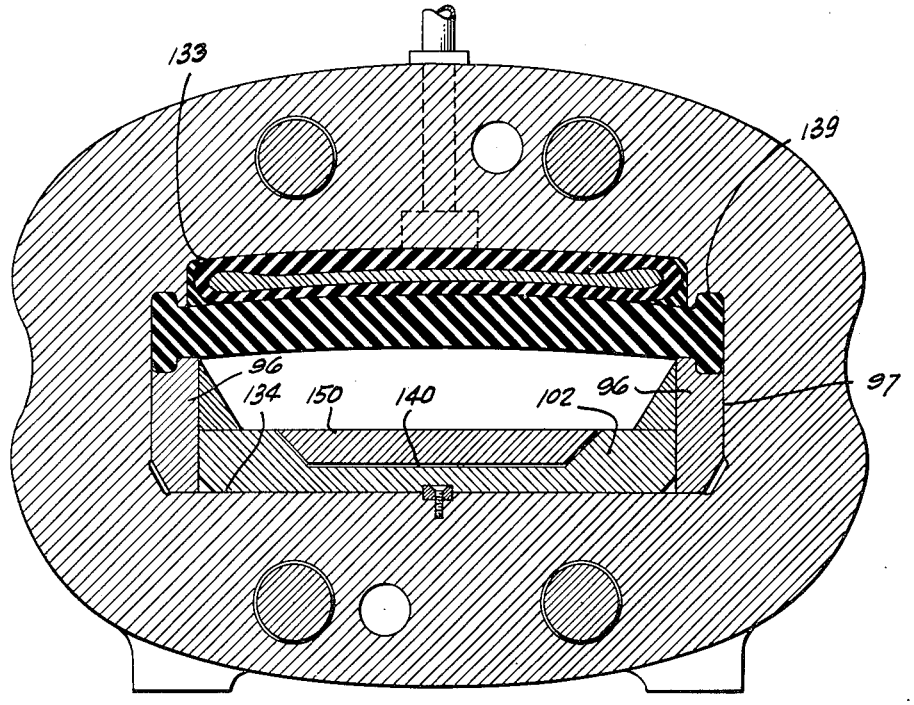
Figure 18 is a cross-section of the "hydro-toroids" press on line 18—18 of Figure 17.

In Figures 17 and 18 there is shown a sheet metal working plant that is substantially the same as that of Figure 1 but includes a press-body 131 which, being horizontally disposed and elongate generally like the form of Figures 1-4, inclusive, is also well adapted for utilization in forming the relatively elongate, shallow parts employed in airframes and similar framed structures. Some of the advantages of this form of press-body over those of the form of Figures 1-4, inclusive, stem from the facts that the press-body 131, being constructed of a plurality of one-piece toroidal laminations 132 united facewise to form a hollow, undivided cylinder, lacks the split-body feature and lateral flanges shown on the body of Figure 1. It is hence cheaper to fabricate and is easier to assemble, than the preceding form. It also occupies a lesser volume and requires fewer bolts than does said form.

The torodial laminations 132 are flattened in the vertical direction, to provide a press-body that has a vertical axis much shorter than its horizontal axis. The hollow, oblate cylindric press body has, like the form of Figures 1-4, two opposed major interior surface portions 133 and 134, see Figures 18, but is better adapted to withstand laterally directed operating thrusts or forces. It can also be more readily mounted in a stable condition on a foundation than the previous form.

The open-ended working chamber portion of the hollow body 131 is capped and completed at each end thereof by means of a special end-plate lamination 135. Each of the laminations 135 has a substantially centrally located, laterally elongate opening 136 therein.

All the laminations, 132 and 135, are united facewise contact by the bolts 137, the only set of load-bearing bolts employed in the press. These bolts of course extend transversely of the laminations and longitudinally through the press body and are disengageably engaged at each end thereof with the face of the adjacent capping lamination 135 by means of nuts 138, here shown as of the "spanner type." Thus, in this form, as well as in the preceding form, the press is susceptible of being assembled to various lengths to suit various customers from stock-piles of laminations, the lengths of the press-body depending of course only on the number of laminations employed.

All the improved features incorporated in the species of Figure 1 can also be embodied in this form, including a bag 22 substantially identical with that of Figure 1. The bag hence includes a reinforcing plate 67 attached thereto and to the inner end of the conduit 41 in the same manner and for the same purposes as described in connection with Figure 1. The bag is laterally conformed to the super-adjacent surface of the upper press-half and is longitudinally domed, as in the form of Figure 1, filler pads 63 of rigidified glass cloth being interposed at each of the bag's ends between the press-body and the bag.

The pad 23 is also domed or crowned laterally, more so than is the bag, and elongate elastomeric fillers not shown but longitudinally grooved and functioning similarly to those disclosed in connection with Figure 1, are interposed between the bag and the pad at the lateral edges thereof and extend longitudinally between the longitudinal regions occupied by the glass cloth fillers 63. The pad is also crowned longitudinally, or is upwardly convex in the longitudinal direction, but filler pads not shown but like pads 63 of Figure 3, take care of the clearances between the pad ends and the super-adjacent surface of the press body.

The grooved elastomeric fillers, as before, act when the operating pressure is applied, to force outwardly of the unit, any air which has been trapped in the grooves and check its re-entry between the bag and the pad when, for example, the bag lifts the pad during the vacuum cycle of the press.

Each of the sides and ends of the bag supporting and metal forming pad 23 is provided with double-beads 139 substantially identical with that of the form of press shown in Figure 1, and the two ends of the pad 23 are spring-clamped to the upper surfaces of the openings 24 in the same manner and for the same purposes as described with reference to that species. However, although bead-seizing longitudinally extending grooves are provided in the upper press body-half as in the press species of Figure 1, the lower body-half does not include such grooves. They may be either contoured into the upper surface of the removable side rails 98, as shown in Figure 18, or may be omitted altogether, as well as the lower portion of the double bead since under almost all operating conditions the pad will be laterally restrained adequately without the lower groove and bead.

Since the press-body 131 is undivided in the longitudinal plane, being integral peripherally from end-to-end, in order to facilitate insertion and removal of the bag and pad, the removable side-rail configuration described as optional with respect to the embodiment shown in Figure 1 is an essential component of the form shown in Figures 17 and 18. Thus, the openings 136 in end plates 135 serve the same purposes, here, as do the openings 24 of Figure 1 and serve the additional purpose, in conjunction with the removable side rails 98 of enabling insertion and removal of the bag and pad without laying open the press-body. To these and other ends, the platens are first withdrawn, whereafter the rail-anchoring bolts (not shown) passing transversely through the side rails into the press-body are backed off or removed. Thereafter, the side rails may be pulled out, substantially parallel to themselves by means of block and tackle engaged with respective screw eyes (not shown) on the ends of the rails. The lateral clearances thereby created at the inner sides of the lower press-body half render it a relatively simple matter to either install or remove the bag and pad. In the latter case, upon removal of the platens, the uncoupled bag and the pad automatically drop downwardly under their own weight and fall onto the surface 134, wherefrom they can easily be removed endwise through either one of the openings 136.

In Figure 17, the work-table means for supporting the platens 25 outside the press-body while they are being loaded and unloaded; the hydraulic ram means for moving same into and out of the body; the hydraulic means for pressurally operating the bag and pad to form the sheet-material and the electrical and console means for controlling these latter two means, are, as shown in Figure 17, substantially identical with the corresponding means illustrated in Figure 1. Therefore, they need not be again described in detail here.

As in the configuration described in connection with Figure 1, working pressures applied to the platen by the end-portions and other portions of the pad are equalized at the opposite ends of the platen, so that end thrusts on the platen are balanced out and the platens are put under structurally unopposed, but balanced, tension. All the other forces set up by press-operation are taken either by the platen-ways in the lower body-half or by the laterally adjacent sides of the press-body.

Together with the sealing action of the clamps 124 on the tail gates of the platens, the outer ends and tail gates of the now immobilized platens close the ingress and egress apertures 24 against extrusion therethrough of the elastomeric bag or pad, to this end being aided by the Micarta seals 90, described in connection with Figures 1-4, inclusive.

The chances of local shearing, or maceration, of the pad are minimized by the fact that no relative motion can occur between the pad and the platens, so that since there is no possibility of the pad being extruded at the apertures 24, the main remaining source of damage that could be incurred by the pad is the sharpness of the edges of the sheet-metal that is being worked. However, since many suitable types of elastomeric material capable of effectively resisting local shearing, "nicking" etc. while under high tension are available on the market concern over the occurrence of this damage is practically groundless.

As shown in Figure 18, the upper surface of the base member 102 of each of the platens 25 is, for a large portion of its area, provided with a depression 140 constituting a "dropped-center," this depression normally being occupied by a filler-plate 150. Normally, the platens 25 are employed only for relatively shallow work and the plate 150 is then in place in the platen. When dup-drawing is undertaken, the plate 150 is removed and "dup" form blocks and sheet material are placed in the depression 140, the press thereafter being operated in the usual manner.

Figure 19:
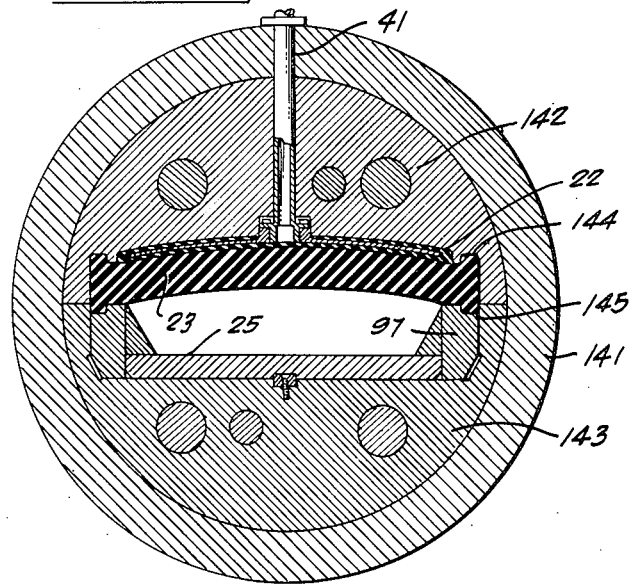
Figure 19 is a cross-sectional view of a modified type of press, hereinafter referred to as the "bench-type" press.
Figure 74:
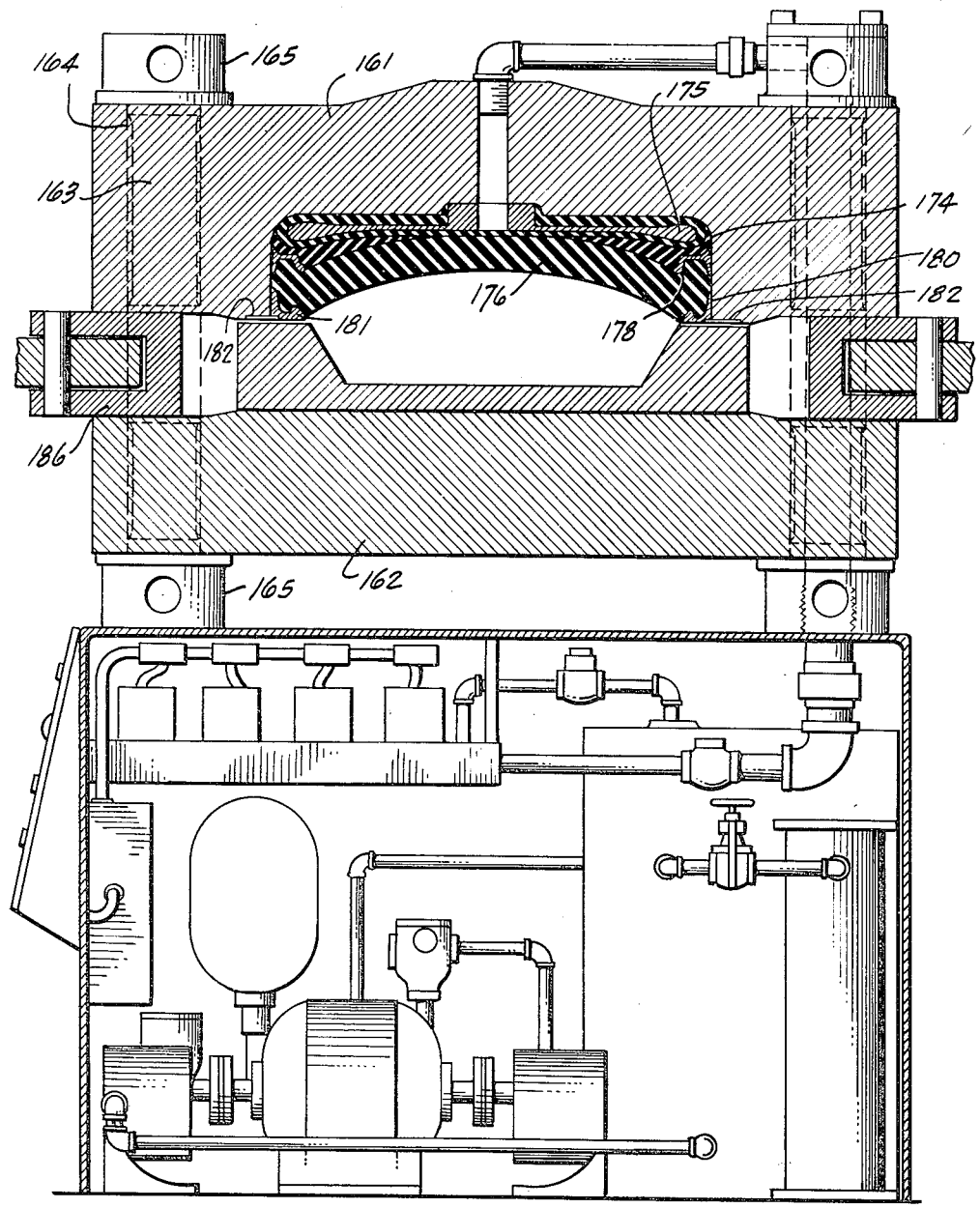

For use in relatively small establishments, where the nature and quantity of the small parts sold thereby or the floor space available would render the use of even the smallest design according to Figures 1 and 17 unfeasible or unprofitable, the embodiment shown in Figure 19 and designatable as the "bench" model of the invention, is contemplated by the present inventive concepts.

This species of the invention essentially comprises an outer shell 141 which, because of the low operating pressures and relatively low hoop tension involved, may well consist of a length of seamless steel tubing of relatively small diameter as compared to that of the aforedescribed embodiments, and preferably of the order of 15 inches, more or less, as desired.

This shell 141 serves chiefly as a means for "uniting" the pair of press-body halves 142 and 143, and as means for translating into hoop tension, the lateral forces generated in members 142 and 143 during press operation. Members 142 and 143 are peripherally free of the shell, but in the case where they are laminated in the longitudinal direction, may be integrated in facewise contact by stud bolts such as those previously described. Members 142 and 143 are concave on their inner faces and are coaxially arranged with their longitudinal edges mating to form a substantially hollow cylinder.

As described in connection with Figure 3, the upper half 142 of the cylinder encloses a bag 22 connected as aforedescribed to the bag operating hydraulic conduit 41, a pad 23, and fillers 63 and 30, all the foregoing parts being constructed, arranged and operating as described hereinbefore. Seating grooves 144 and 145 are provided in the two body-halves to laterally anchor the bead on the pad edges, as before, and the ends of the pad are beaded and anchored by spring-clamps, not shown, but substantially identical with those previously identified by reference numeral 82.

The lower hemi-cylinder 143 contains a single platen 25 constructed and arranged as hereinbefore described, that is, with hydraulically initiated, pad-applied end thrusts thereon balanced by the tail-gate construction at the opposite ends of the platen so as to obviate the employment of closures for the open ends of the press. Removable side rails 97 are provided for enabling removal of a jammed platen and facilitating the removal of the bag and pad and are constructed, and operate, the same as those described in connection with Figure 18. Means for taking up the finite lateral clearances between the sides of the platen and the adjacent side-portions of the interior of the lower body-half are provided and are similar to those described with reference to the species of Figure 1. Since the press and platen are relatively small and sufficient clearances can be provided between the platen and the body-half to permit it, the platen can be moved laterally into and out of the container by hand, and no platen-operating system such as the hydraulic cylinders and linkage of the species of Figure 1 is necessarily provided. The hydraulic system (not shown) for operating the bag and pad can be relatively simple, including only hand-operated valves and requiring no control system or control console.

The "bench-type" press of Figure 19 has a number of definite merits, not least among which is its utmost simplicity in design, fabrication, and operation. As hereinbefore implied, it is, moreover, of relatively small bulk compared to its capacity and productiveness, although it is susceptible of handling only rather small-sized, relatively light and shallow work as compared to the practically unlimited length of work that can be handled by the types of Figures 1 and 17.

Figure 21:
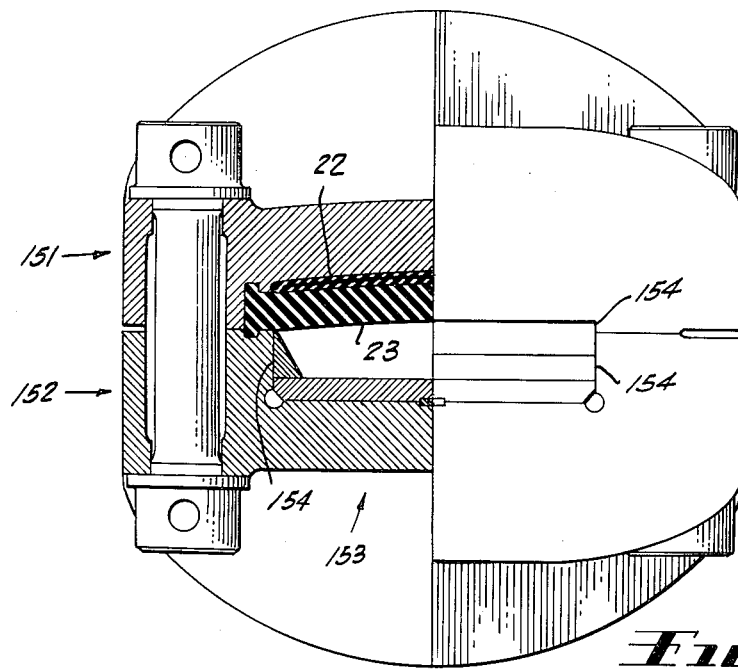
Figure 21 is a view, partly in central section and partly in end elevation, of this latter form of the press-body.

In Figures 20 and 21, there is shown a plant that includes a horizontally disposed press, having an elongate body divided along its diameter. This press incorporates the novel basal principles, and most of the structural improvements, of the species of Figures 1–17, inclusive, plus additional advantages due to simplifications in its mode of fabrication.

As shown, the press includes a body divided diametrally into two single-piece halves 151, 152 which are disposed coaxially and mated along their longitudinal edges. Each body-half 151, 152 essentially comprises a hollow chamber-portion, 153, bearing at each end a vertical recess 154, the recesses mutually registering to define openings 155 for the insertion and removal of the platens. Each end portion of each body-half bears a generally rectangular rib 156 for reinforcing the end portion of each body-half around the adjacent recess 154. Longitudinally intermediate the ribs 156 each body-half bears a plurality of longitudinally spaced, arcuate ribs 157 provided to prevent bending and absorb the hoop tensions and other stresses set up by the internal forces generated during the operation of the press. Hence the thickness of the walls defining each half of the operating chamber of the press body can be minimized so as to reduce the concentration or mass of metal without sacrificing strength.

The upper and lower body halves are united by prestressed bolts 158 disposed between the reinforcing ribs and extending vertically between the body-halves, through bolt-holes provided near the edges of the body halves. These bolts are disengageably engaged with the body-halves by means of spanner-type nuts 159.

The upper body-half 151 contains, as shown in Figure 21, a bag 22, and a pad 23 and the lower half, as shown in Figure 20, is adapted to contain a pair of laterally movable platens 25, each of which is identical with that of Figure 1. They are supported on tables 28 substantially identical with those already described and operated by rams 31 and 34 previously described. The bag 22 is hydraulically actuated against the pad 23 to form the work on the platens 25 in the manner previously recited by a hydraulic power plant substantially identical with that previously described, this power plant and the rams being controlled by an electrical system which is, to all practical purposes and ends, identical with that previously mentioned.

The bag 22 is constructed, mounted and operated as before described in connection with that of Figure 1 and the pad is anchored and sealed at its sides and ends by means, not shown, which are substantially identical with those hereinbefore explained. Fairings and fillers for the bag and pad assembly identical with those previously described, are provided in this form of the invention.

If desired, the body-halves may incorporate the removable side rails of Figure 18 to facilitate and to expedite removal or insertion of the bag and pad, but since the castings are comparatively light and the top one can be readily lifted, such means are not essential and the body-halves preferably are laterally integral, the platen sides bearing directly against the adjacent sides of the body half. In this form, it should be noted, fewer bolts are employed than in the previously described forms.

The operating cycles of this form of the invention are identical with those of the forms previously described and hence need no description here.

Fabrication of the press is appreciably simplified and economized by the fact that each of the body-halves is adapted to be cast in one piece, preferably of an improved but militarily non-critical material such as "nodular" iron, malleable iron or similar ductile material. Since the foundry patterns for these body-halves are obviously of a simple nature and the coring is limited substantially to the provision of a pair of rather simple, relatively thin elongate prisms or rectangular parallelopipeds, for defining the operating chamber in each body half, the cost of fabrication is comparatively low.

Obviously, fabrication of this press involves the employment of manufacturing instrumentalities which, consisting mainly of foundry equipment are quite different from those employed in fabricating the laminated press-bodies of Figures 1 and 17. The latter involve a greater number of major parts, and require a relatively great amount of machining operations both in contouring the laminations and of "boiler plate" steel, in finishing each side of each lamination, and in "finishing" the inside surface of each lamination. During national crises, therefore, it might well prove advantageous to release machine tools to other and more vital work, and concentrate production efforts upon the "cast-halves" form of Figures 20 and 21, despite the fact that this type of press reaches its highest economic efficiency when used to form relatively shallow but extremely elongate parts and notwithstanding the fact that its design and fabrication facilities are not as amenable to sudden changes in the design length of the press-body, as to meet rapidly changing demands of customers, as are the aforedescribed forms. The form of Figures 20 and 21 involves only two major parts and any machining that may be required thereon can be performed on standard machine tools without major alterations of the latter.

Figure 23:
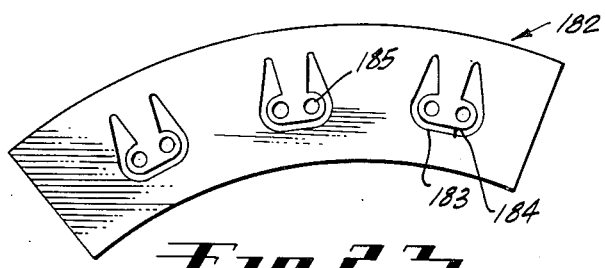
Figure 23 is a fragmentary detailed plan view of one of the clamping members employed in this last-mentioned form of the invention for anchoring the pad.

In Figures 22–24, inclusive, there is shown an embodiment of the inventive concepts set forth, or implied, hereinabove which enables substantially all the advances provided by this invention to be employed in deeper drawing work than that achievable by any of the foregoing embodiments. This latter embodiment also enables this type of work to be done in a smaller floor space.

To these and other ends, the press essentially consists of a plurality of vertically stacked laminations and the design-depth of the intermediate laminations, or platens, can be readily varied to produce the relatively deeper drawn articles for which this press is intended, the thickness, distortion limits, etc. of the bag and pad being suitably varied to enable them to properly function with these deeper laminations to form sheet-metal articles which have a depthwise dimension considerably greater than either of the other two dimensions.

In this embodiment of the invention, more specifically considering same, a plurality of laminations or "decks" are arranged in vertically stacked relationship in substantially parallel planes. The uppermost lamination 161 is rigidly spaced from, and united to, the lowermost lamination 162 by means of vertically extending stud bolts 163 disposed adjacent the peripheries of these laminations and passing transversely therethrough by means of suitable bolt-holes 164 therein and terminating oppositely in spanner type nuts 165 which render the bolts readily engageable and removable. The stud-bolts are of the "centering" type, that is, the diameter of the central portion and the end portion thereof where the bolts pass through the laminations is larger than the other portions of the bolt; these diameters being so proportioned to the distance to the centers of the laminations as to force all the laminations to center accurately when the bolts are "reached." Hence, there is no possibility of the laminations failing to properly register when the press is assembled.

Each of the four intermediate laminations 166 consists of a disk-like main body 167 having a co-planeal re-curved tail portion 168. The tails of these laminations are so constructed as to enable the laminations to be pivotally mounted to the framework of the press in such manner as to enable any one of them to be swung from a loading and unloading position outside the press into the vertical space between the uppermost and lowermost laminations 161 and 162. In the latter position, a lamination 166 carrying the sheet-material on form-blocks in the concavity 171 thereof, is centered vertically with the uppermost and lowermost laminations to enable the forming operations to be performed, whereafter the lamination 166 carrying the finished work, can be swung outwardly to unloading position.

To enable these movements to be performed, a lamination mounting construction is provided which includes "devised" spacers 172 formed on spacer-blocks 186 which are disposed between the upper and lower laminations 161 and 162 and passed through at each end by one of the stud bolts 163. Each spacer 172 is adapted to pivotally support a pair of the platens 166 by means of bolts 190 suitably passing pivotally through the tail end of the platen. The platens are of course arranged in parallelism to the upper and lower laminations and project from the one side of the quadrangular framework 173 constituted by the laminations and platens. The opposite side of the framework 173 includes a similar construction for pivotally mounting the other two platens 166. The upper lamination 161 includes a concavity 174 in its lower surface which contains a substantially circular, expansible hydraulic force-applying bag 175 constructed, except for its circular shape, substantially in the same fashion as the bags 22 previously described herein. This bag is reinforced substantially in the same manner as the previously described bags and is suspended from the conduit 41 in substantially the same manner.

Immediately below the bag 175 and confronting it substantially coextensively in a substantially circular sheet-material forming pad 176 composed of elastomeric material. This pad is upwardly domed to provide adequate clearance for the swinging passage of the platen bearing the work on form blocks. The periphery of the pad 176 is double-beaded, that is, the pad includes a bead 177 projecting upwardly from its upper surface at the edge thereof, the pad also including a bead 178 projecting downwardly from its lower surface at the edge thereof.

Complementary clamping and sealing means are provided for anchoring and sealing the pad and include an upper circular clamp member 179 and a lower circular clamp member 181 these two members being similar in cross-section to those already described and being arranged in respective facewise contact with the respective beads. The outer periphery of each of these members 179 and 181 is provided with a plurality of vertically spaced annular grooves 180 (Figure 24) for the purpose of concentrating or intensifying the unit pressure between these facing surfaces.

The lower pad-clamping and platen-sealing member 181 is, at its outer peripheral portion, resiliently mounted to the lower face of the upper lamination as, and for the purposes, recited hereinbefore for the other resilient clamps. More specifically, the outer lower edge of the clamp 181 is continued laterally outwardly around the periphery of the clamp as a planeal ring 182 and this extension includes, distributed circumferentially, a plurality of apertures 183, each of which includes an ear 184 perforated as at 185 to receive flush-headed bolts for attaching the clamp resiliently to the lamination, substantially as shown in Figure 23.

While one of the platens 166 is centered in operative position in the press and the work is being formed therein, the other three platens are of course outside the press body, one of them then undergoing unloading and at least one of the other two "outside" platens undergoing loading.

The hydraulic power plant, shown in Figure 24 as operatively associated with the bag 175 of the press is substantially identical with that of Figure 1 and hence needs no further description except as given hereinafter in connection with Figures 25 and 26.

The hydraulic system employed in operating the moving parts of each of the aforedescribed presses is diagrammatically illustrated in Figure 25. Since it is, generally, no more than a means for powering the rams 31 and 34 and for pressurizing and scavenging the bags 22 and constitutes per se no integral factor of the inventive concepts, it is unnecessary to set forth the structural details of each of its parts.

Essentially, the system consists of a reservoir 201 for the hydraulic fluid connected by suitable conduits including filters 203 to a high pressure pump 204 and a low pressure and vacuum pump 207. Pumps 204 and 207 are driven by an electric motor 208 and transmission shafts 209.

From the pump 204 a pressure line 211 leads pressurized fluid towards a bag 22 by conduit means including a four-way valve 212. Line 211 includes a pressure gage 213 controlled by a needle valve 214, the line also including a relief valve 215.

The valve 212 is located "onwardly" from the relief valve and includes a tie-in for line 211 and an outlet line 216 in which is included a pressure switch 217. Conduit 44, leading to the bag inlet, tees off beyond this pressure switch.

The suction system for scavenging a bag 22 includes the pump 207 acting now as a suction pump. From this pump runs a low pressure line 218 provided with a branch 219 which "feeds" a pressure gage 221. Onwardly of the gage in line 218 is an unloading valve 205 which unloads to the tank 201. Onwardly of valve 205 is a check valve 224 series connected in line 218.

Line 218 leads from valve 224 to a four-way valve 225 through a check-valve 226.

A line 227 leads from valve 225 to a line 229 which leads to "two-way" conduit 41.

Branched off from the T 228 is a check valve 233 in series with a vacuum switch 234 and a vacuum gage 235. Teed off between switch 234 and gage 235 is a check-type relief valve 236, through which fluid drains back to tank 201.

From the one port in the four-way valve 225 a line 231 leads through a filter 232 to the reservoir 201 to which return flow is connectible on occasions hereinafter described.

For operating the platen-actuating cylinders 31 and 34, the fluid drawn through line 230 is, upon proper automatic operation of the four-way solenoid valve 225, directed through conduit 218, conduit 223 and a T 237 to an accumulator 238. This accumulator continuously applies pressure through line 239 to two, four-way solenoid valves 209 and 210 connected in parallel to the accumulator. This pressure fluid is selectively directed either to the left-hand or the right-hand end of one of the cylinders 31 and 34 through conduits 242 or 243 in order to effect movement of the two platens out of the press; or into the right-hand end of either one of these cylinders to effect movement of either one of the platens into the press body.

Fluid, in each case, is returned to tank 201 via the four-way valve through the conduits 251 and 252 shown.

The operation of the hydraulic system will be described by considering each phase of a working cycle in turn. The phases of the forming cycle consist of the following operations, exclusive of the platens-moving operations: (1) filling and pressurizing the bag; (2) decompressing the bag; (3) scavenging the bag. The cycle is initiated by closing the "start-cycle" switch E on the control console. The electrical circuit thereby closed energizes the solenoid valves 212 and 225 and causes the valves 212 and 225 to direct the pressure fluid from pumps 204 and 207 to the bag 22 of any of the presses hereinbefore described.

When the pressure rises to 400 p. s. i., in the 5000 p. s. i. limit unit pressure systems hereinbefore described, the low pressure pump 207 is unloaded to the tank 201 through unloading valve 205, whereas the high pressure pump 204 continues to deliver and build up pressure in the bag to the predetermined forming pressure. At this predetermined pressure, stop cycle switch H (part 321 in Figure 26) is either manually closed, or automatically acting pre-set pressure switch 217 acts. Either of these switch-actions causes valve members inside valve boxes 212 and 225 to shift into position for the next phase of the cycle area of valve 215 in the high pressure line and opens if the pressure exceeds a certain amount.

The next phase, decompression of the inflated bag, is accomplished through a surge valve J, Figure 25 and valve 212 to the tank 201, electric timing relay 316, Figure 26, having been set to establish the time allowed to dissipate this surge-pressure. At the end of this timed interval, the timing relay causes valves 212 and 225 to shift into position for the scavenging, or vacuum, phase of the cycle.

While high pressure pump 204 idles to the tank through valve 212, the low pressure pump 207 draws oil from the bag through valve 225 and returns it to the tank 201. When all the oil is removed from the bag by pump 207 a slight vacuum will have been created. This vacuum lifts the bag and pad clear of the work on the platens. This vacuum condition also trips a vacuum switch 234 (Figure 25) which causes valve 225 to shift to the position in which pressure fluid from pump 207 is delivered to the accumulator 238 and to the valves 209 and 210. These valves control the movements of the platens into and out of the press-body.

These actions complete phase No. 3 of the forming cycle.

Inward and outward movements of the platens are effected by pressing the "in" or "out" buttons of the control panel of Figure 26, as desired. These switches close circuits which control the valves 209 and 210, these valves delivering oil from pump 207 to platen actuating cylinders 31 and 34.

In order to safeguard against improper sequence of operations, which might cause damage to the press, certain electrical and hydraulic interlocks are provided. By these means, a pressure cycle cannot be initiated unless a platen is correctly indexed inside the press-body as indicated by the physical closing in Figure 26 of limit switches 332 or 333. Moreover, the tables cannot be moved either into or out of the press body unless there exists a vacuum sufficient to lift the bag and pad clear of the platens, as indicated by the actuation of the vacuum switch 234. To prevent the tables colliding, limit switches 334 and 331, Figure 26, provide that the one table must be fully retracted before the other table can be moved.

The configuration of the electrical elements constituting the control system that is operable from the control console to cycle the hydraulic system and the movable parts of the press through both the pressure and the vacuum cycles of operation of the plant is shown in Figure 26. The system is depicted as comprising a main line through conductor path 301 energizable by an A. C. energy source, not shown, the conductor paths leading through a safety disconnect switch 302 and main fuses 303 to a main line contactor 304, one of the two main conductor paths of the system leading thence to the A. C. motor 208. The other main conductor path of the system, employed for energizing the plant's controls, leads from fuses 303 through a control transformer 306, onward through fuses 307 to a bank of control-relays generally indicated by reference numeral 345. This bank consists of individual relays 308, 309, 310, 311, 312, 313, 314, 315, 346 and special timing relay 316. The "output" terminals of these relays are connected, as shown, to a non-conductive terminal strip 317.

From the terminal strip 317 the control conductor paths extend onwardly to include paths feeding vacuum switch 234, pressure switch 217, and valve solenoids 335, 336, 337, 338, 341, 342, 343, and 344, hereinbefore generally designated as "F." Other conductor paths, shown, lead from the terminal strip 317 to the limit switches 331, 332, 333, and 334 shown associated with the platens of the press itself. The "onward" portions of all these conductor paths lead from the terminal strip, solenoid valves and limit switches to the control panel's terminal strip 318 and thence to the control panel 347.

The control panel includes the "start" control button 319 "start-cycle" button A, the "stop-cycle" button 321, left-platen "in" button 325, right platen "in" button 323, left platen "out" button 326, right platen "out" button 322, "emergency" button 320, vacuum gage 330, vacuum indicating light 324, pump indicating light 329, pressure indicating light 328, and platen "in" indicating light 327.

In putting the plant into operation, first the safety switch 302 is closed whereafter the "start" button 319 is closed. This effects closing of the main line contactor 304, thus starting the pumps-driving motor 208, the "running" condition of which is indicated by pilot light 329 on the control panel. The automatic closing of the contactor 304 also completes the energizing circuits to the control panel and to the solenoid valves and limit switches.

When the "start" button is pressed, solenoids 335 and 344 are energized through the contacts of relay 310. Such action starts the vacuum cycle automatically.

The latter cycle continues until a vacuum, sufficient to close the contacts on the vacuum switch 234, is created, whereupon the indicator light 324 is illuminated. The closing of these contacts effects energization of relay 311 which allows either the press "start cycle" sequence to be started (provided that a platen is properly indexed in the press, hereinafter explained); or allows the table "in" and "out" sequences to be started.

At this point, in the logical sequence of operation of the press, the operator can move either the left or the right platen by the respectively so-designated push button located on the control panel. For example, to move the right table into its predetermined operative position in the press, the operator presses button 323 located on the control panel 347, thereby energizing relay 312 through the conventional "N. C." contact of relay 313 and through the contact of limit switch 331, the latter being held closed by the engagement therewith of the left-platen in its "out" position. Relay 312 energizes valve solenoid 343 which moves table "in." When the right platen is in its operative position in the press-body, limit switch 333 is actuated, energizing relay 309 and illuminating pilot-light 327 on the control panel. At this juncture, also, relay 309 closes the circuit to relay 308, this being the last step necessary to condition the press for the forming-operation.

Actually to initiate forming operation, the "start-cycle" button is pressed, thereby energizing relay 308 through the conventional N. C. contacts in the pressure switch 340. Energized relay 308 energizes solenoid valves 341 and 338 and illuminates pilot light 329 located on the control panel 347. This effects de-energization of relay 310 which opens the circuit to solenoid valves 344 and 335.

This last series of operations terminates the vacuum condition of the bag 22 and initiates the pressure cycle. Pressure in the bag builds up to a point where either the pressure switch 217 or the "stop cycle" button 321 (normally closed contacts) are opened.

In both cases this action de-energizes relay 308 which opens the circuits to the valve solenoids 338 and 341 (which allow the valve spools to come to a spring loaded center position) and energizes the time delay relay 316. This allows the bag to decompress from high pressure to low pressure before opening the solenoid valves to the low pressure vacuum line.

The time delay relay acts through a preset time of six seconds at the end of which the time delay relay 316 closes to close relay 310, which energizes valve solenoids 344 and 335 again initiating the vacuum cycle. The pressure control panel "pressure on" indicating light extinguishes as soon as the vacuum cycle commences, indicating that pressure fluid is no longer being applied to the bag 22.

Automatically at this point vacuum action is again applied to the bag through the operation of solenoid valves 335 and 344, retracting the bag up into contact with the upper inner surface of the press body so as to permit removal of a platen, or both platens, from the press body.

In order to actually remove a platen from the press-body, the operator closes the button 322 for energizing the circuits that effect outward movement of the right-hand platen. This energizes the relay 314 through limit switch 334 and closes circuit to solenoid valve 336. The right-hand platen thus moves outwardly and when it reaches its full "out" position, it operates the conventional "N. C." contacts on the limit switch 334 de-energizing the connected circuit that controls the powering of the hydraulic cylinder 34 and halting the outward movement of the right-hand platen.

Electrical control manipulations for effecting the outward movement of the left-hand platen are similar to those aforedescribed but employs limit switches 331 and 332 as well as relays 314 and 315 and solenoid valves 337 and 343 instead of those previously utilized.

When the emergency button 320 is pressed, all effective electrical circuits are broken and the bag unloads its contents to the reservoir. In this status, in order to resume operations of any sort, it is mandatory that the start cycle button be pressed and the whole cycle must be re-initiated in order to operate the press at all.

Although certain of the presently preferred specific instrumentalities are set forth to accomplish the inventive objects and in certain specific configurations, it is to be understood that these particular appliances and instrumentalities by no means constitute limitations on the scope of the invention, instead merely furnishing examples of certain of the numerous modes and means contemplated by the invention for achieving its manifold ends.

In fact and in law, the ambit of the invention is limited only by the scope of the sub-joined claims.

I claim:

1. Apparatus for conforming sheet-material on form means to predetermined shapes, comprising: a plurality of substantially annular laminations arranged in substantially vertically stacked relationship; tie-means passing through said laminations in the vertical direction; means rigidly fixing the uppermost and lowermost laminations to said tie-means in vertically spaced mutual relationship; means pivotally connecting the intermediate laminations with respect to said tie-means so as to enable lateral swinging of respective ones of said intermediate laminations alternately inwardly and outwardly of the stack; expansible pressure-fluid receiving means disposed in said uppermost lamination substantially co-planeally with the major plane of said lamination; a source of pressure-fluid; means for circulating said fluid through said fluid-receiving means; shape-recuperable, pressurally distortable means disposed in confronting adjacency to said expansible fluid-receiving means and adapted to be moved thereby in a working direction; a work-and-form means supporting surface located on each of said intermediate laminations confrontingly adjacent said distortable means; and an upwardly extending surface peripherally disposed on the upper face of each of said intermediate laminations and extending sufficiently towards said distortable means to enable outwardly-thrusting engagement thereof by said distortable means upon working movement of the latter whereby to effect operative immobilization of said intermediate laminations in their inwardly disposed working positions.

2. Apparatus for conforming sheet-material on form-means to predetermined shapes, comprising: a substantially hollow container having two opposed separated portions of its interior surface fixed in mutually confronting relationship to each other, said container including openings disposed at opposite locations thereon; expansible, pressure-fluid receiving means disposed in said container confrontingly adjacent the one of said opposed surface portions and including means for flow-connecting same to a pressure-fluid source, the surface thereof confrontingly adjacent to said opposed surface portion being pressurally displaceable theretowards; means for circulating a pressure fluid through said receiving means from said source; shape-recuperative pressurally distortable means disposed in confronting adjacency to said displaceable surface and adapted to be pressurally urged thereby towards said opposite surface portion of said container; work-and-form-means carrier means movable through said openings into adjacency to said opposite surface portion of said container with the work disposed operatively adjacent said distortable means; means projecting oppositely from the peripheral portion of said distortable means towards the respectively adjacent one of the opposed interior container-surface portions and adapted to be engaged for enabling anchoring engagement of said distortable means in position adjacent said one of said opposed surface portions and normally clear of said carrier means; complementary clamping means disposed in disengageable engagement with the oppositely projecting portions of said projecting means, the one of said complementary clamping means being arranged and conformed to receive the major portion of the thrust-loading of said distortable means; and resilient means connecting said one of said clamping means to the adjacent portion of the container, whereby to enable said resiliently mounted clamping means to sealingly contact the peripheral portion of said carrier means and prevent extrusion of said distortable means outwardly between said carrier means and said container; and to effect automatic return of the edges of said distortable means to its normal position clear of said carrier means and clear of the said other of said major interior surfaces upon removal of operating pressure therefrom, thereby to enable unobstructed lateral removal and insertion of said carrier means with respect to said container.

3. Apparatus for conforming sheet material to predetermined shapes on form-means, comprising: a pair of matching, substantially semi-cylindrical, horizontally disposed container-defining components, the longitudinal edge of each semi-cylinder having a laterally outward extension, said extensions being facewise abutted; fastening means passing through the facewise abutted extensions and uniting said components in mutually confronting relationship to define a substantially hollow cylinder open at each end and having two opposed major interior surface portions; expansible pressure fluid-receiving means disposed in confronting adjacency to the one of said surface portions; means for circulating a pressure-fluid through said receiving means; shape-recuperable, pressurally distortable means anchored in said container in confronting adjacency to the inwardly facing surface of said receiving means; carrier means, for supporting sheet-material mounted on form-means, laterally movably mounted in the other of said major interior surface portions in confronting adjacency to the inwardly facing surface of said distortable means and adapted to be laterally moved into and out of operative adjacency to said surface of said distortable means; and means on said carrier means adapted to be engaged by said distortable means on working distortion thereof so as to immobilize said carrier means.

4. Apparatus for conforming sheet material to predetermined shapes on form-means, comprising: a plurality of oblate toroidal laminations each having a rectangular cross-section, said laminations being arranged in facewise contact to define a hollow oblate cylindric container having two opposed major interior surface portions, said container having an opening at each end thereof; disengageable fastening means passing facewise through said laminations and longitudinally of the apparatus and uniting said laminations substantially rigidly in said facewise contact, said fastening means being disengageable to enable longitudinal separation of said laminations, whereby to enable addition and subtraction of laminations thereby to increase and decrease the length of said container; expansible pressure-fluid receiving means disposed in confronting co-extensiveness with the one of said major interior surface portions of said container; means for circulating a pressure-fluid through said receiving means; shape-recuperable pressurally distortable means anchored in said container in confronting co-extensiveness with the inwardly facing surface of said receiving means; carrier means for operatively supporting the work mounted on form-means, said carrier means being laterally movably mounted in the major interior surface portion that is opposed to the first-said such surface and lying in coextensive confronting adjacency to the inwardly facing surface of said distortable means; and means so arranged on said carrier means and on said container as to be mutually engaged together by said distortable means on working distortion of the last-said means thereby to concurrently effect closing of the open ends of said container and immobilization of said carrier means.

5. Apparatus for conforming sheet material to predetermined shapes on form-means, comprising: a plurality of oblate toroidal laminations each having a rectangular cross-section, said laminations being so arranged in facewise mutual contact as to define a substantially horizontally disposed, substantially hollow cylindrical container somewhat flattened in the vertical direction, each end of said hollow container having a disk-like apertured member arranged in facewise contact therewith, the aperture thereof registering with the hollow interior of the container to provide ingress and egress means therefor; disengageable fastening means passing through all the aforesaid laminations longitudinally of the apparatus and uniting the laminations in facewise contact, said fastening means being disengageable to enable longitudinal separation of said laminations thereby to enable addition and subtraction of laminations whereby to increase and decrease the length of said container; expansible pressure-fluid receiving means disposed in confronting coextensiveness with the one of the major interior surface portions of said container; means for circulating a pressure-fluid through said receiving means; shape-recuperable pressurally distortable means anchored in said container in confronting coextensiveness with the inwardly facing surface of said receiving means; carrier means for operatively supporting the sheet material mounted on form means, said carrier means being laterally movable through said apertures into and out of the container to dispose the work in confronting adjacency to the inwardly facing surface of said distortable means; and means arranged on said carrier means so as to be engaged by said distortable means on working distortion of the last-said means thereby to effect closing of said apertures in said container while concurrently immobilizing said carrier means.

6. Apparatus for conforming sheet-material to predetermined shapes on form-means, comprising: a plurality of laminations vertically stacked in substantial parallelism; fastening means disposed adjacent the periphery of the stack and passing transversely through the laminations for rigidly uniting the uppermost and lowermost laminations in vertically spaced relationship, the uppermost lamination having a re-entrant lower surface, the intermediate laminations being disposed in mutually co-planeal relationship, each of the latter laminations having a location on its periphery pivotally associated with the adjacent one of said fastening means so as to enable lateral swinging of each intermediate lamination into and out of spaced registry with said re-entrant surface; each of said intermediate laminations having a re-entrant upper surface adapted to support sheet material mounted on form-means in operative adjacency to said uppermost fixed lamination; expansible pressure-fluid receiving means disposed in said uppermost lamination in confronting adjacency to said re-entrant surface on said uppermost lamination; means for circulating a pressure-fluid through said receiving means; shape-recuperable pressurally distortable means anchored in said container in confronting adjacency to the inwardly facing surface of said receiving means; the upwardly-directed portion of said re-entrant surface that re-enters the upper portion of each of said intermediate laminations being so arranged with respect to said distortable means as to be engaged thereby on distortion thereof, whereby to immobilize that one of said intermediate laminations which is then in registry with said uppermost lamination.

7. Apparatus for conforming sheet-material to predetermined shapes on form-means, comprising: a plurality of substantially horizontally disposed; substantially parallel laminations tied together at their peripheral portions, the uppermost and lowermost laminations being stationary and the intermediate laminations being disposed in mutual coplanarity and laterally individually movable into and out of registry with said uppermost, stationary lamination, the uppermost lamination having a re-entrant lower surface and each of the intermediate laminations having a re-entrant upper surface adapted to support sheet material mounted on form-means in operative adjacency to said surface on said uppermost lamination; expansible pressure-fluid receiving means disposed in said uppermost lamination; means for circulating a pressure-fluid through said receiving means; shape-recuperable pressurally distortable means anchored in said container in confronting adjacency to the inwardly facing surface of said receiving means; and means disposed peripherally of each of said intermediate laminations and adapted to be engaged by said distortable means so as to immobilize in indexed, operative position, the one of said intermediate laminations then in registry with said uppermost lamination.

8. Apparatus for conforming sheet material to predetermined shapes on form-means, comprising: a pair of partially cylindrical hollow members arranged coaxially and mated along their longitudinal edges to define a substantially hollow cylindrical container having two opposed major interior surface portions and having an ingress and egress opening at each end; a plurality of peripherally extending, longitudinally spaced ribs on the exterior surface of each of said partially cylindrical members adapted to neutralize hoop tension and the like stresses in the latter members; a surface extending laterally outwardly from each longitudinal edge portion of each of said partially cylindrical members, the surfaces on adjacent edge-portions being facewise abutted; fastening means passing transversely through each pair of abutted surfaces; expansible pressure-fluid receiving means disposed in confronting adjacency to the one of said major interior surface portions; means for circulating a pressure-fluid through said receiving means; shape-recuperable pressurally distortable means anchored in said container in confronting adjacency to the inwardly facing surface of said fluid-receiving means; carrier means for supporting the sheet-material on form-means, said carrier means being movably mounted on the other major interior surface for lateral movements through said openings; and means so disposed on said carrier means as to be adapted to be engaged by said distortable means on working distortion thereof so as to effect closing of said openings in said container while concurrently immobilizing said carrier means.

9. Apparatus for conforming sheet material to predetermined shapes on form-means, comprising: a pair of cylindric, one-piece members arranged coaxially and mated along their longitudinal edges so as to define a substantially hollow container having two opposed major interior surface portions, each end of said container having an ingress and egress opening therein enabling lateral access to the interior of the container; each edge of each of said one-piece members having a laterally outward extension adapted to facewise mate the opposite extension on the other cylindric one-piece member; fastening means passing transversely through the aforesaid mated portions; expansible pressure-fluid receiving means disposed in said container in confronting adjacency to the one of said major interior surface portions; means for circulating a pressure-fluid through said receiving means; shape-recuperable pressurally distortable means anchored in said container in confronting adjacency to the inwardly facing surface of said receiving means; carrier means adapted to support sheet-material on form means, said carrier means being laterally movably mounted in the other of said two major interior surface portions in confronting relationship to the inwardly facing surface of said distortable means; and means arranged on said carrier means for balanced lateral thrusting engagement by said distortable means on working distortion thereof so as to then immobilize said carrier means.

10. In a hydraulic diaphragm-press for forming sheets on form-means, the press being of the type that includes a substantially hollow container having an interior major surface adapted to support the sheets carried on the form-means: at least one opening formed in a wall of said container; carrier means for said sheets on form-means movable through said opening and bearing a formation adapted to substantially close said opening; a pressurally distortable member arranged in the container in operatively confronting relationship to the sheet material; means for pressurally displacing the major area of the sheet-confronting surface of said distortable member against said sheet material sufficiently to form same into predetermined shapes; and complementary clamping members disposed in said container in sealingly-tight engagement with at least portions of the periphery of said distortable member for anchoring same in place in the container, one of said complementary clamping members having its outer edge-portion resiliently attached to said container outwardly adjacent said predetermined portions and said one of said clamping members having the opposite edge-portion normally unsupported and free and extending into the hollow body so as to adapt it to tortable member under said pressural displacement and allow said opposite edge portions of said clamping members to sealingly contact the formations on said carrier means, thereby to prevent extrusion of said distortable member from said container and to automatically return said portions to their initial positions and shape upon removal of the pressure on said pressurally distortable member.

11. In a hydraulic diaphragm-press that includes a substantially hollow container having two opposed major interior surface portions and the container having an ingress and egress opening in at least one end thereof: a platen for supporting sheet material on form-means and laterally movable through said opening into and out of said container, said platen comprising a base, a laterally bodily movable side rail disposed lengthwise of each of two opposite sides of the upper surface of said base; a tail gate piece fixedly disposed at each of the two opposite ends of said platen, each of said pieces being inwardly rabbeted at the inner face of its outer ends so at to laterally spacedly receive the adjacent end of a side rail; and deflectable means disposed in each lateral space between each end of each side rail and the opposed surface of the corresponding rabbet, said means being normally in a laterally expanded condition so as to outwardly urge said rails to close all "finite clearances" between the sides of the platen and the adjacent interior surface of the container, and said means being contractible to enable lateral movement of said platen into and out of the container.

12. A forming, loading and unloading, control and power unit for hydraulically press-forming sheet materials, comprising: a hydraulic sheet-material press including a substantially horizontally disposed cylindric container containing in its upper portion an elastomeric pressure-fluid bag and an elastomeric force-applying member arranged operatively coextensive therewith; said cylindric container having an ingress-and-egress opening at each end; a pair of platens for carrying sheet-material supported on form-means into and out of operative adjacency to the inward surface of said force-applying member; means on each of said platens adapted to be engaged by said force-applying member on operation thereof by said bag so as to set up balanced end-thrusts on the platens sufficient to immobilize same in place in said container; an elongate platen-support disposed at each end of said cylinder to extend outwardly therefrom from a level just below the bottom surface of said platens in said container and adapted to support and guide said platens during endwise movement thereof laterally into and out of the container through the adjacent one of said openings; a source of power; platen actuating means operatively connected to said power source and to the outer end of each platen for effecting said lateral movements; a main prime mover; a hydraulic pump drivenly connected to said mover and flow-connected respectively to a hydraulic-fluid source and to said bag for furnishing pressure-fluid to the bag; another hydraulic pump drivenly connected to said mover and flow-connected respectively to said bag and to said fluid source for evacuating fluid therefrom on occasion and returning same to said fluid source; and control means for activating said prime mover, pumps and bag arranged adjacent said container and operatively connected to said prime mover and to said fluid source.

13. Apparatus for conforming sheet material to predetermined shapes on form-means, comprising: a tubular outer shell open at each end face; a pair of matching cylindric members arranged coaxially in said tubular member in radially spaced confronting relationship and in peripheral contact with the adjacent wall portions of the tubular shell, the confronting faces of said cylindric members being concave and the adjacent longitudinal edge portions of the two cylindric members extending toward each other to define a substantially central, longitudinally extending working chamber, the cylindric members being held against relative separation transversely of the apparatus solely by the radial reactions between same and said outer tubular shell so as to form a thick-walled inner concentric shell having a longitudinally extending working chamber; a pressure-fluid receptacle disposed in the concavity of a first one of said cylindric members in confronting adjacency thereto; means for circulating a pressure fluid through said receptacle to effect working-expansion thereof; each of the longitudinal edges of the first said cylindric member bearing a groove extending longitudinally thereof; an elongate, pressurally distortable member disposed in the first-said concavity in confronting adjacency to said receptacle, each of the longitudinal edges of said distortable member bearing a bead therealong seated in and embraced by the adjacent groove; means to retain each bead in its respective groove; work and form-means carrier means slidably mounted in the concavity of the second of said cylindric members in confronting adjacency to said distortable means; and means arranged on said carrier means for engagement by said distortable means on working distortion thereof so as to effect closing of the open ends of the inner container defined by the cylindric members and dually effect immobilization of said carrier means.

14. In apparatus of the type described and including a tubular outer shell open on at least one end face thereof: cylindric members, each having a concave, inner face, arranged coaxially of said tubular member with their peripheries in radical adjacency to the inner wall of said tubular member and with the concavities mutually confronting so as to define an inner shell including a longitudinally extending working chamber; pressure-generating work forming means disposed in said working chamber and applying radially outwardly directed forces transversely of the cylindric members when said apparatus is work-formingly operated; and surfaces located in the peripheral marginal region of each of said cylindric members and adapted to move apart under the radially outward and circumferentially directed actions of the forces generated by actuation of said pressure-generating means, thereby to dissipate said forces harmlessly.

15. Apparatus for conforming sheet material to predetermined shapes on form-means, comprising: a substantially hollow body having a first major interior surface-portion and a second major interior surface-portion, said portions being arranged in opposed spaced relation in generally horizontal planes; pressurally distortable, pressure-applying means disposed in said body adjacent to said first surface-portion; means for pressurally forcing said distortable means toward said second surface-portion in a working movement; an opening extending from the interior of said body through a side wall thereof and forming an access passage in a generally horizontal plane; and carrier means movable through said opening into and out of the interior of said body to carry sheet material on form-means into workable adjacency with said distortable means; said apparatus including means cooperating with said carrier means to prevent dislodgement of the latter and to maintain said sheet-material and form-means in optimum working position during the conforming operation of the apparatus.

16. Apparatus for conforming sheet material to predetermined shapes on form-means, comprising: a substantially hollow body having a first major interior surface-portion and a second major interior surface-portion, said portions being arranged in opposed spaced relation in generally horizontal planes; pressurally distortable, pressure-applying means disposed in said body adjacent to said first surface-portion; means for pressurally forcing said distortable means toward said second surface-portion in a working movement; an opening extending from the interior of said body through a side wall thereof and forming an access passage in a generally horizontal plane; and carrier means movable through said opening into and out of the interior of said body to carry sheet material on form-means into workable adjacency with said distortable means; said carrier means being provided with upstanding rim means at opposed edge portions thereof extending substantially equal distances toward said distortable means and being engageable thereby during the conforming operation to produce equal and opposite thrust reactions in the plane of the carrier means to immobilize same and to maintain said sheet material and form-means in optimum working position during said conforming operation.

17. Apparatus for conforming sheet material to predetermined shapes on form-means, comprising: a substantially hollow body having a first major interior surface-portion and a second major interior surface-portion, said portions being arranged in opposed spaced relation in generally horizontal planes; pressurally distortable, pressure-applying means disposed in said body adjacent to said first portion; means for pressurally forcing said distortable means toward said second surface-portion in a working movement; at least one opening extending from the interior of said body through a side wall thereof and forming an access passage in a generally horizontal plane; carrier means movable through said opening into and out of the interior of said body to carry sheet material on form-means into workable adjacency with said distortable means; thrust-balancing means carried at opposite points on the margin of said carrier means and extending upwardly toward said distortable means and being of sufficient size to close said opening; means resiliently mounted on said body below marginal portions of said distortable means and above said thrust-balancing means and adapted to be forced downwardly against the latter to eliminate any finite clearance during the conforming operation, thus to prevent extrusion of said distortable means.

18. Apparatus for conforming sheet material to predetermined shapes on form-means, comprising: a substantially hollow body having a first major interior surface-portion and a second major interior surface-portion, said portions being arranged in opposed spaced relation in generally horizontal planes; expansible pressure-fluid receiving means disposed within said body confrontingly adjacent said first surface portion, said fluid receiving means including means for flow connecting same to a pressure-fluid source; means for circulating a pressure-fluid through said receiving means from said source; pressurally distortable, pressure-applying means disposed in said body and anchored by its margin to said body and lying in contact with said receiving means to be urged by the expansion thereof toward said second surface-portion; openings extending from the interior of said body through the side wall thereof to form access passages in a generally horizontal plane; carrier means movable through said openings into and out of the interior of said body to carry sheet material on form-means into workable adjacency with said distortable means; said carrier means being adapted to lie on said second surface-portion and transmit working loads thereto; and upstanding means carried on marginal portions of said carrier means and adapted to close said openings and to transmit balanced end-thrusts to said carrier means upon contact by said distortable means during the conforming operation.

19. Apparatus for conforming sheet material to predetermined shapes on form-means, comprising: a tubular outer shell open on at least one end-face thereof; a pair of cylindric members mounted in said shell, said members being substantially co-extensive in length and extending along at least the major portion of the length of said shell with their curved outer faces contacting the inner wall of the shell and with their inner faces confronting each other; each of said inner faces being formed with a concavity and said two concavities confronting each other and cooperating to define a working chamber extending longitudinally of said shell and open at least at the same end face as said shell; a pressurally distortable pressure-applying member mounted in the concavity of a first one of said cylindric members and extending longitudinally of said shell; means for pressurally forcing said distortable means toward said second concavity in a working movement; and carrier means movable through said open end into and out of the interior of said working chamber to carry sheet material on form means into workable adjacency with said distortable members; the major part of the internal forces generated in the conforming operation urging said cylindric members radially outward against said shell, whereby the latter will absorb said forces in hoop tension.

20. Apparatus as claimed in claim 19 in which said carrier means is provided at each end with thrust-taking formations extending toward said distortable member to be engaged thereby during the conforming operation to apply balanced endwise thrusts to said carrier means to immobilize same.

21. In a hydraulic sheet-material press that includes a substantially hollow cylindrical container having an opening at least at one end and having two major opposed interior surface-portions, the container including a pressurally distortable pressure-applying member mounted in confronting adjacency with a first one of said surface-portions and means for pressurally forcing said distortable means toward said second surface-portion; a platen movable through said opening into the interior of said container, the lateral extent of said platen being sufficiently less than the width of said interior surface-portions to define a lateral space at each side of said platen extending substantially the full length of said distortable member and said interior surface-portions; an elongate key-like member interposed substantially co-extensively between each of the longitudinal sides of said platen and the adjacent wall of the interior of said container, the surface of each of said key-like members that lies adjacent said distortable member being adapted to contact the latter and anchor it in place to prevent its dislodgment during the confronting operation; said key-like members being removable endwise to permit removal of said distortable member without disassembling the container.

References Cited in the file of this patent

UNITED STATES PATENTS

| | | |
|---|---|---|
| 1,177,240 | Gates | Mar. 28, 1916 |
| 1,260,002 | Lanhoffer | Mar. 19, 1918 |
| 1,330,711 | Kinney et al. | Feb. 10, 1920 |
| 2,281,133 | Abercrombie | Apr. 28, 1942 |
| 2,317,440 | Cannon | Apr. 27, 1943 |
| 2,375,599 | Walton | May 8, 1945 |
| 2,385,083 | Kemerer | Sept. 18, 1945 |
| 2,418,393 | Bridgens | Apr. 1, 1947 |
| 2,493,135 | Greutjen | Jan. 3, 1950 |
| 2,550,672 | Chyba | May 1, 1951 |

FOREIGN PATENTS

| | | |
|---|---|---|
| 568,734 | Great Britain | Apr. 18, 1945 |